Feb. 18, 1958 — C. A. RIDINGS ET AL — 2,823,782
COIN APPARATUS
Filed Aug. 24, 1955 — 12 Sheets-Sheet 2

Clements A. Ridings,
Alvin W. Holstein,
Elmer S. Marr,
Inventors.
Koenig and Pope,
Attorneys.

Feb. 18, 1958     C. A. RIDINGS ET AL     2,823,782
COIN APPARATUS

Filed Aug. 24, 1955     12 Sheets-Sheet 4

Clements A. Ridings,
Alvin W. Holstein,
Elmer S. Marr,
Inventors.
Koenig and Pope,
Attorneys.

Feb. 18, 1958 C. A. RIDINGS ET AL 2,823,782
COIN APPARATUS
Filed Aug. 24, 1955 12 Sheets-Sheet 5

Clements A. Ridings,
Alvin W. Holstein,
Elmer S. Marr,
Inventors.
Koenig and Pope,
Attorneys.

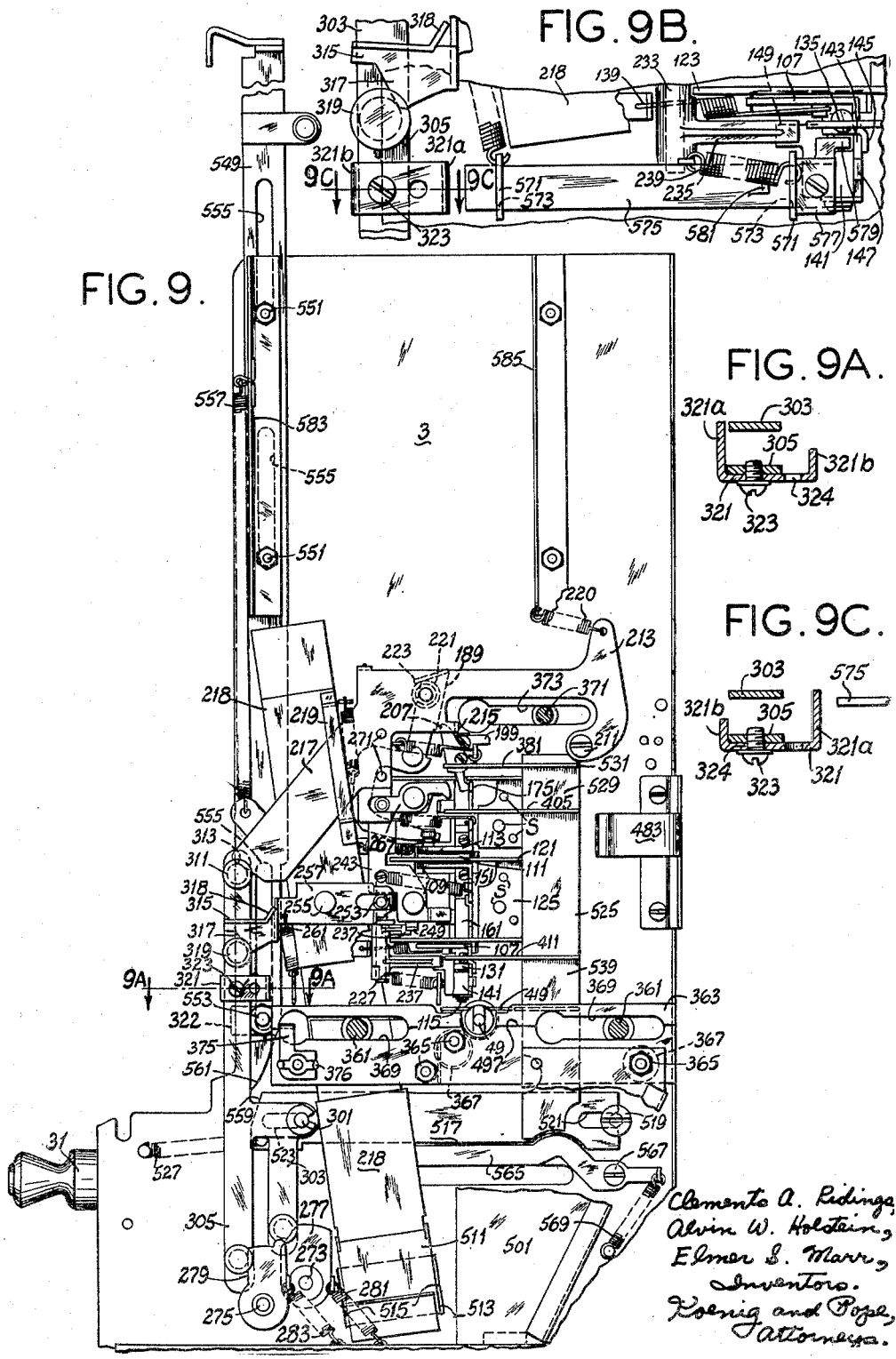

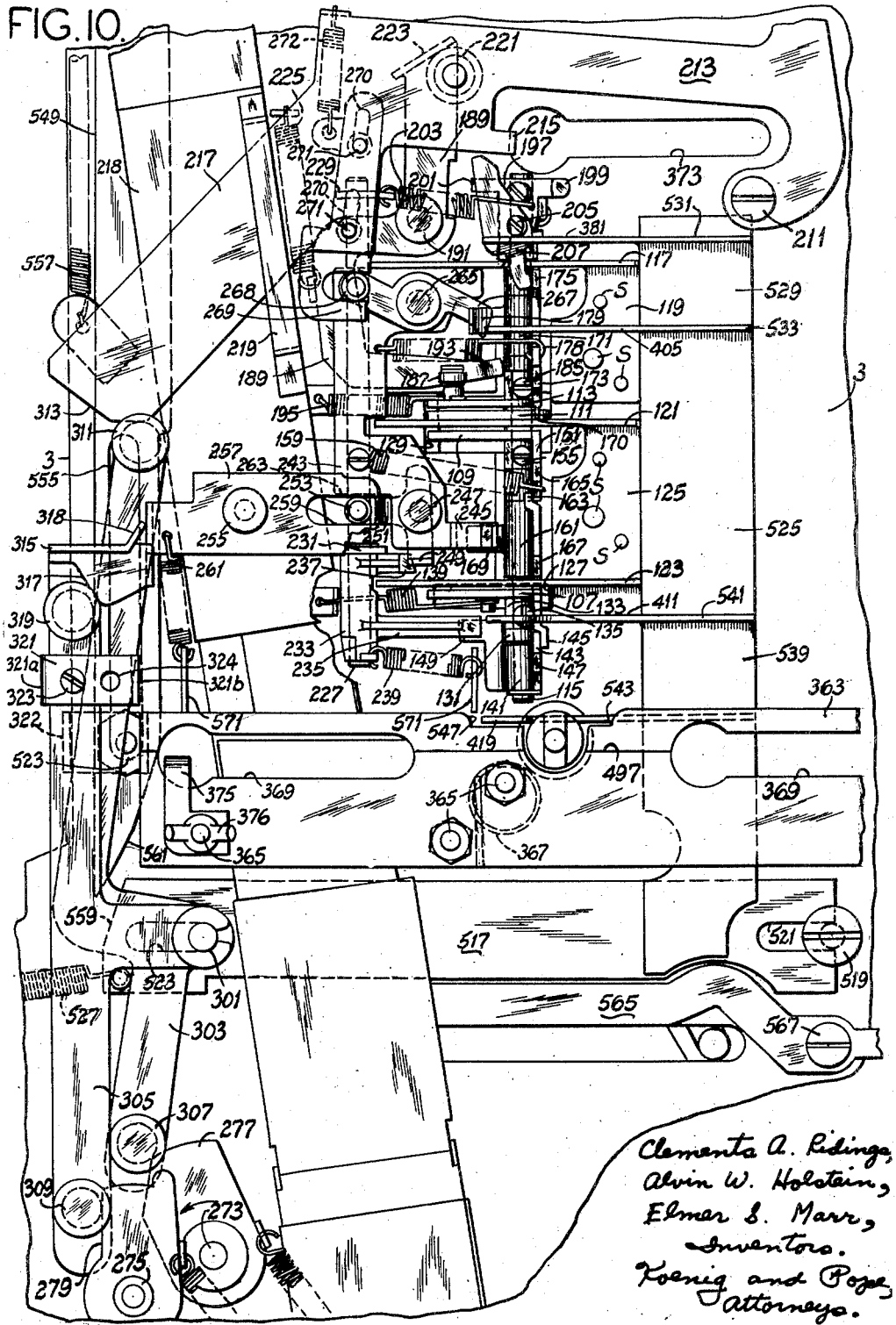

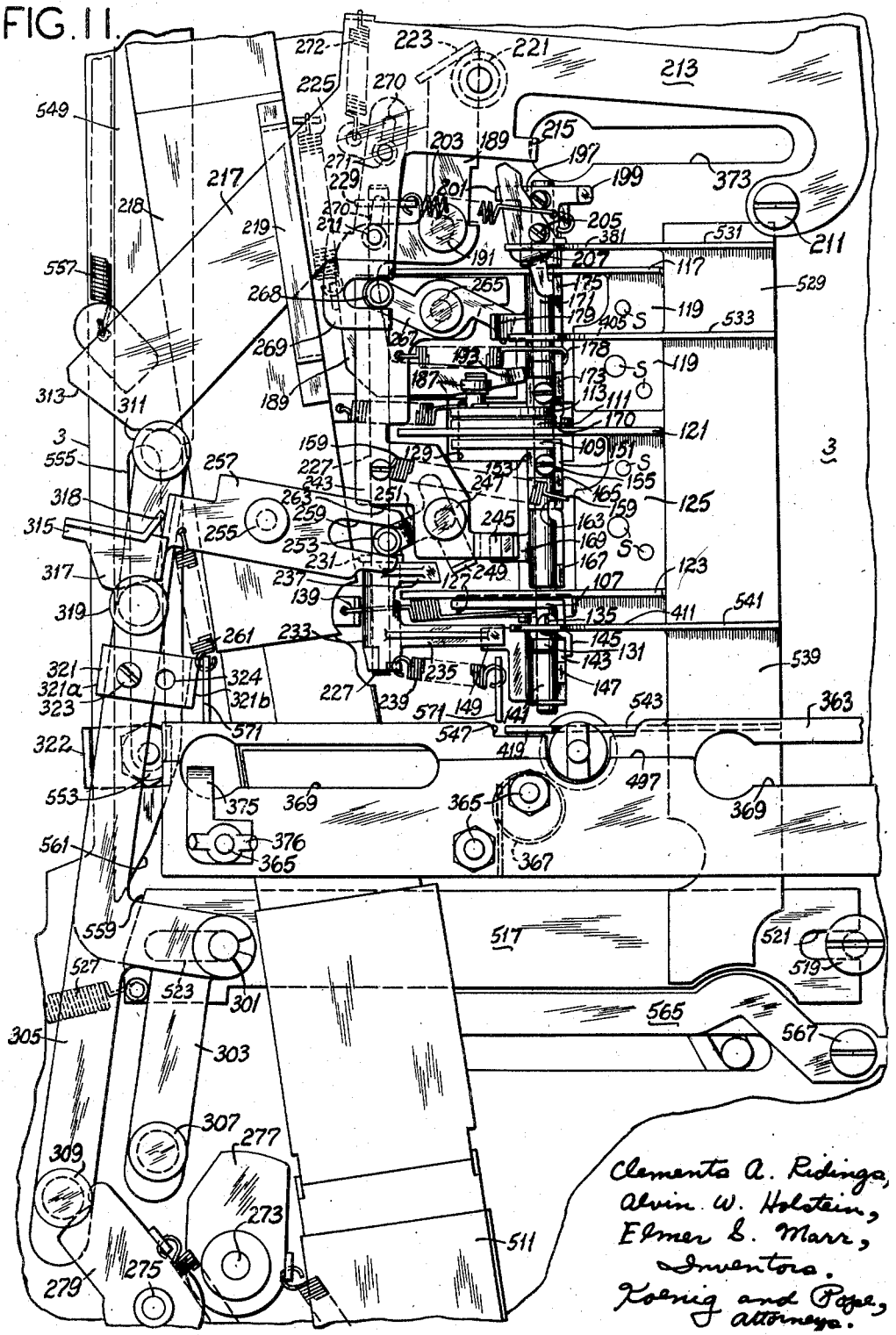

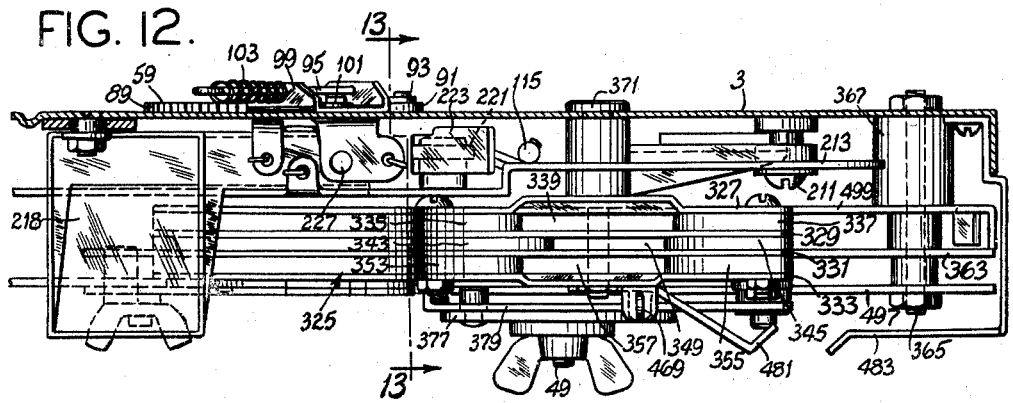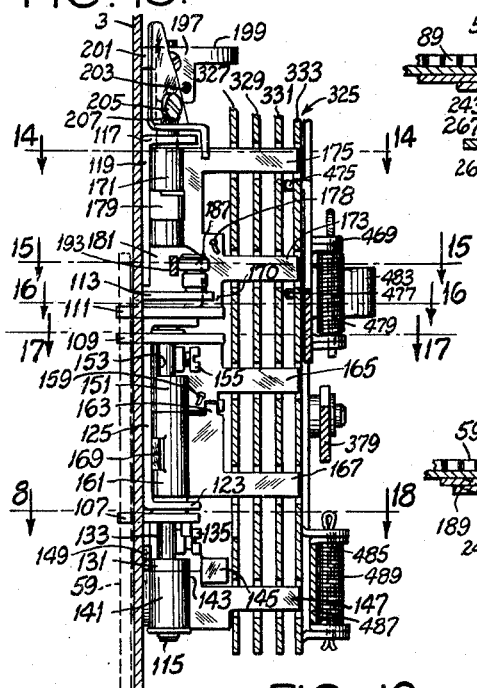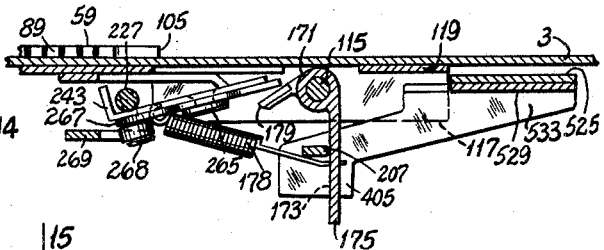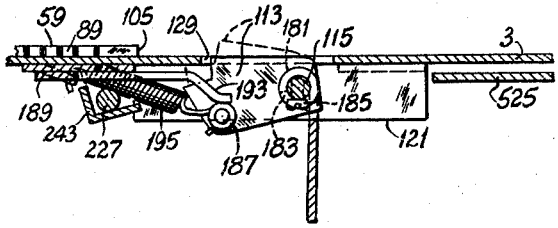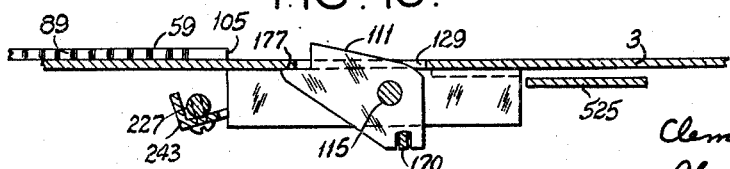

Feb. 18, 1958  C. A. RIDINGS ET AL  2,823,782
COIN APPARATUS
Filed Aug. 24, 1955  12 Sheets-Sheet 10

Clements A. Ridings,
Alvin W. Holstein,
Elmer S. Marr,
Inventors.
Koenig and Pope,
Attorneys.

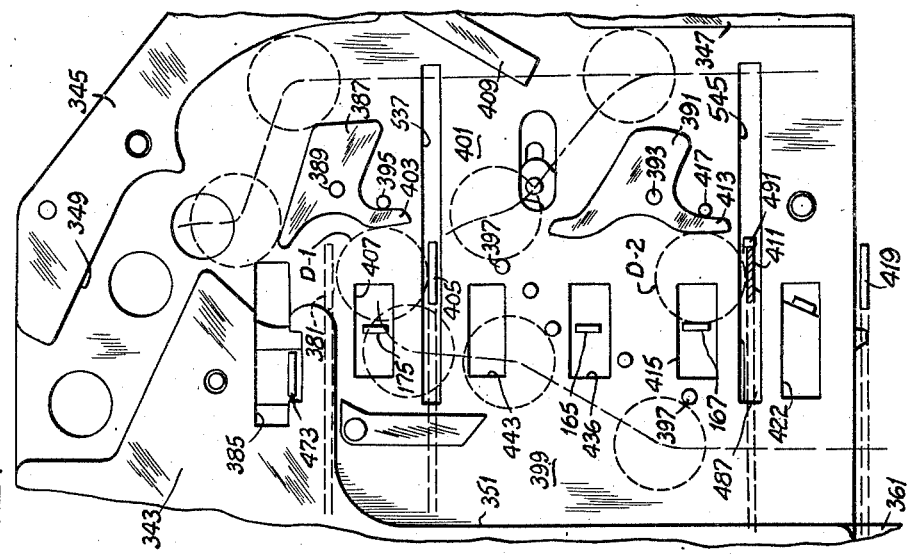
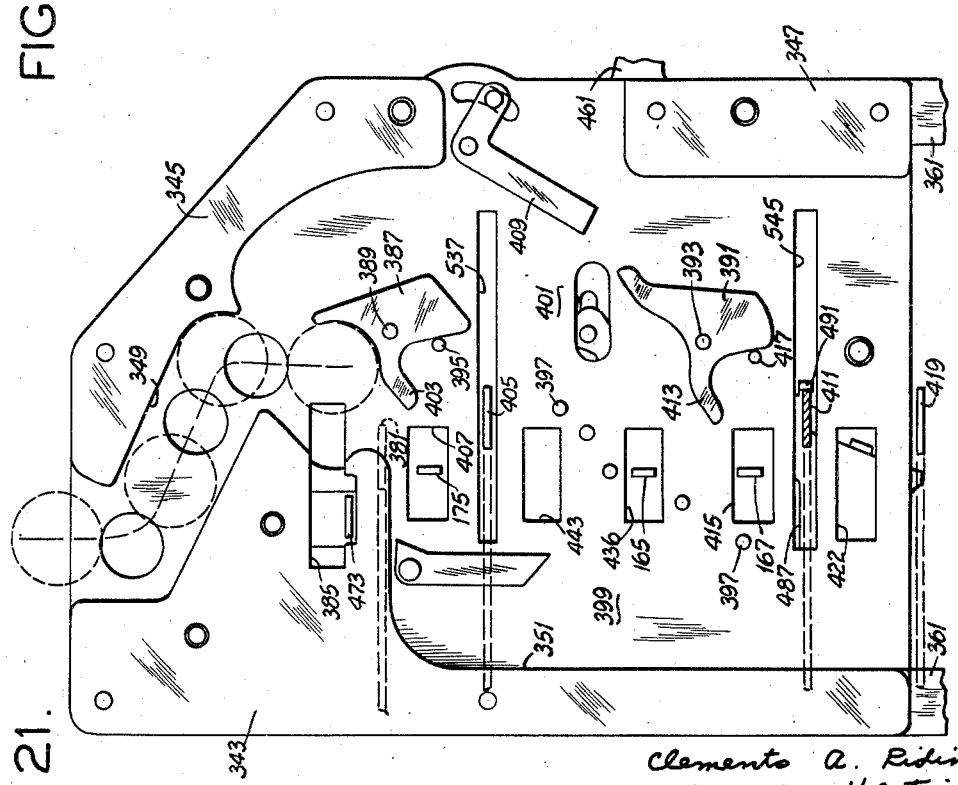

Feb. 18, 1958 C. A. RIDINGS ET AL 2,823,782
COIN APPARATUS
Filed Aug. 24, 1955 12 Sheets-Sheet 12

Clemento A. Ridings,
Alvin W. Holstein,
Elmer S. Marr,
Inventors.
Koenig and Pope,
Attorneys.

United States Patent Office 2,823,782
Patented Feb. 18, 1958

2,823,782
COIN APPARATUS

Clements A. Ridings, Normandy, Alvin W. Holstein, Lemay, and Elmer S. Marr, St. Louis, Mo., assignors, by mesne assignments, to National Vendors, Inc., a corporation of Missouri Application August 24, 1955, Serial No. 530,333

14 Claims. (Cl. 194—57)

This invention relates to coin apparatus, and more particularly to such apparatus for controlling the operation of a vending machine or the like.

Among the several objects of the invention may be noted the provision of a manually operated mechanical coin apparatus for controlling the operation of a vending machine or the like, operable to dispense items of three different prices, for example, twenty-five cents, thirty cents and thirty-five cents; the provision of coin apparatus of this class which is adapted for conversion to a different three-price set-up, for example, from the above-mentioned set-up to a twenty cent, twenty-five cent, thirty cent set-up; the provision of apparatus of this class which, in the case of twenty cent items, is capable of accepting any combination of nickels and dimes totalling twenty cents, and in the case of twenty-five cent items, is capable of accepting a silver quarter or any combination of nickels and dimes totalling twenty-five cents; the provision of apparatus of this class which, in the case of thirty-five cent items, is capable of accepting either a silver quarter and two nickels or a silver quarter and a dime; and the provision of apparatus of the class described which is reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a front elevation of an apparatus constructed in accordance with this invention, partly broken away;

Fig. 9 is a view similar to Fig. 8, with certain parts removed and other parts broken away;

Fig. 9A is an enlarged section taken on line 9A—9A of Fig. 9;

Fig. 9B is an enlarged fragment of Fig. 9 showing certain revisions for changing the price set-up;

Fig. 9C is a section taken on line 9C—9C of Fig. 9B;

Fig. 10 is an enlarged view of a portion of Fig. 9, illustrating a moved position of parts;

Fig. 11 is a view similar to Fig. 10, illustrating another moved position of parts;

Fig. 12 is an enlarged horizontal section taken on line 12—12 of Fig. 8;

Fig. 13 is a vertical cross section taken on line 13—13 of Fig. 12;

Figure 8:
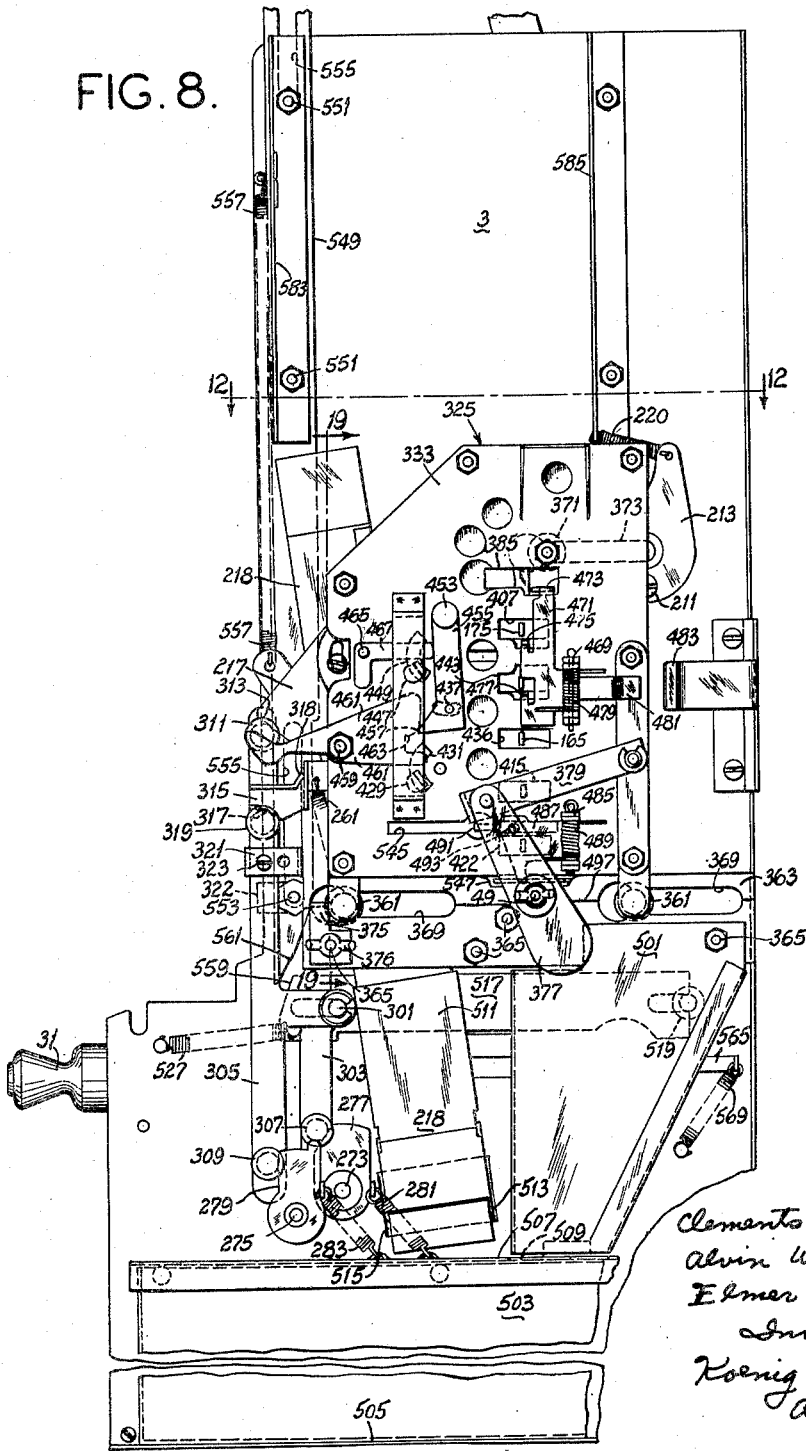
Fig. 8 is an elevation of the right side of Fig. 1, with parts broken away.
Figure 20:
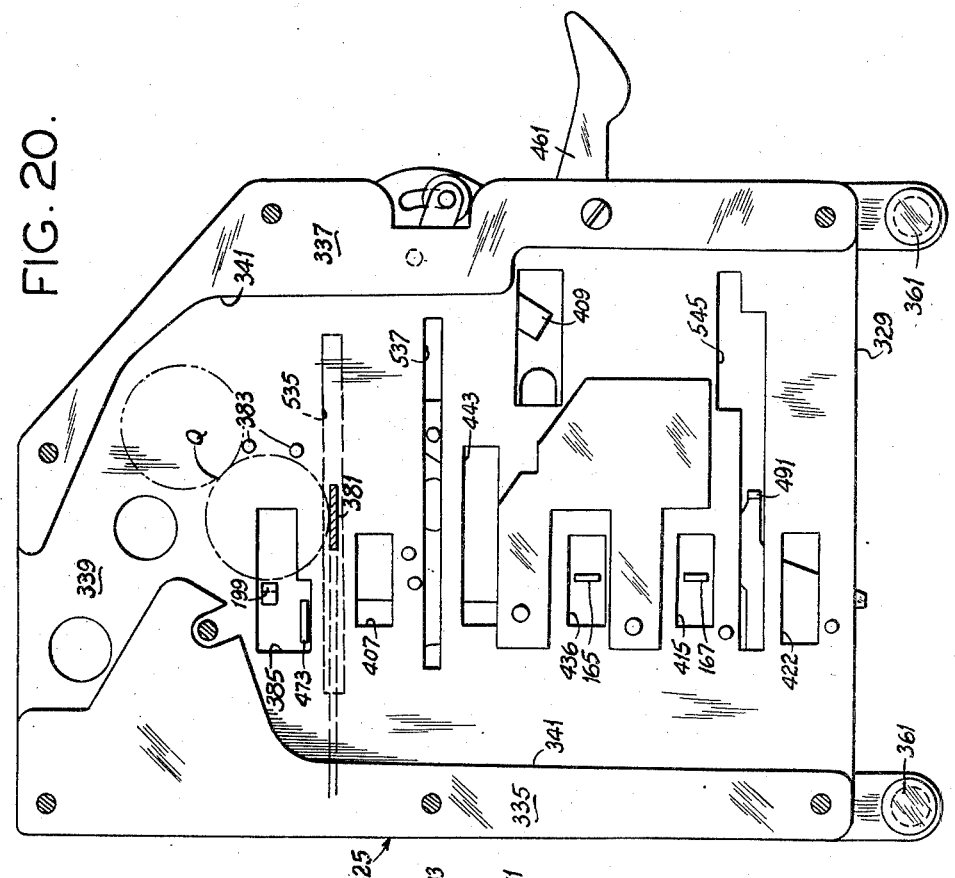
Figure 19:
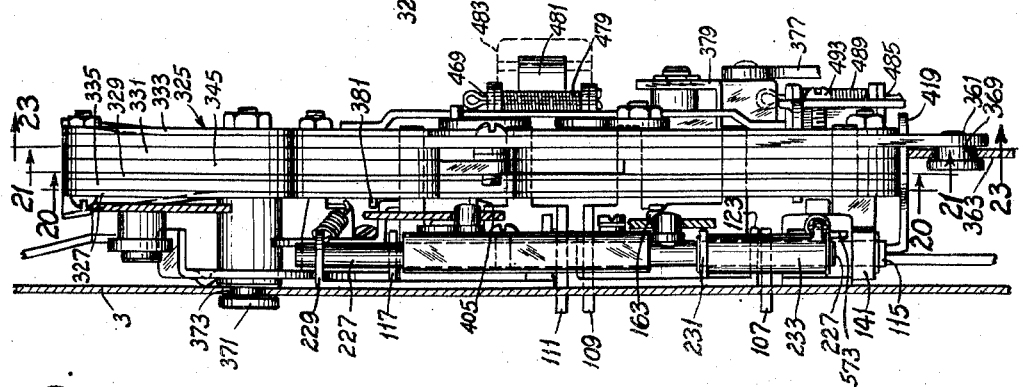
Figure 24:
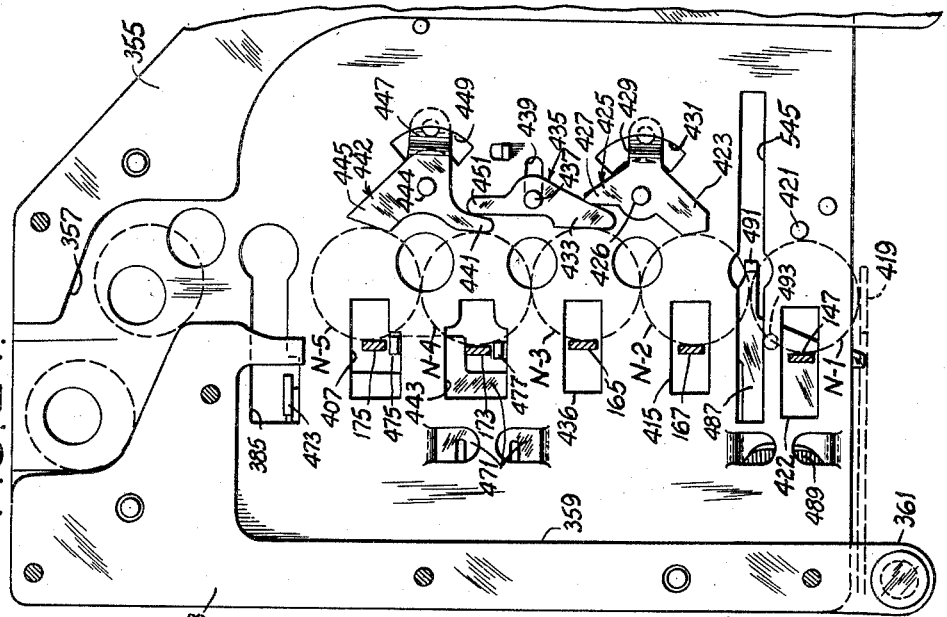
Figure 23:
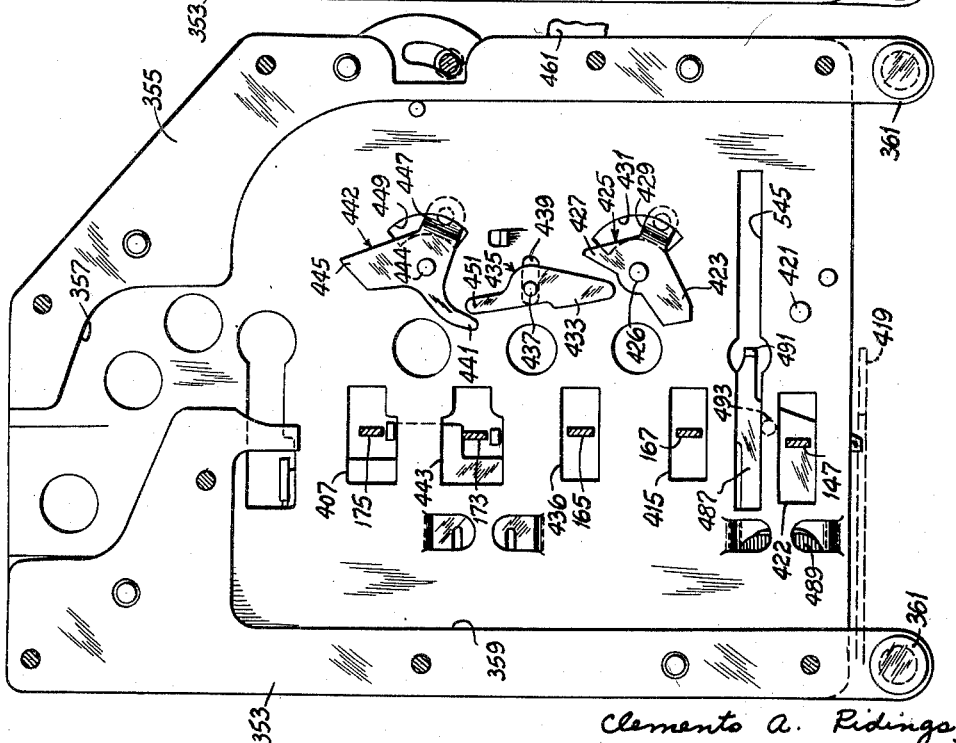

Figs. 14—18 (Figs. 17 and 18 appearing on sheet 3) are horizontal sections taken on lines 14—14, 15—15, 16—16, 17—17 and 18—18 of Fig. 13;

Fig. 19 is an enlarged view taken on line 19—19 of Fig. 8;

Figs. 20 and 21 are vertical sections taken on lines 20—20 and 21—21 of Fig. 19;

Fig. 22 is a view corresponding to Fig. 21, illustrating a moved position of parts;

Fig. 23 is a vertical section taken on line 23—23 of Fig. 19; and,

Fig. 24 is a view corresponding to Fig. 23, illustrating a moved position of parts.

Corresponding reference characters indicate corresponding parts throughout the several views of the drawings.

The invention is herein disclosed as it relates to a cigarette vending machine having a plurality of vertical magazines arranged side-by-side, each for holding a stack of packages of cigarettes. Associated with each magazine is a dispensing device comprising a selector or pull-out rod which must be pulled out from a retracted position and then returned to retracted position to dispense a pack of cigarettes. The coin apparatus of this invention is adapted to allow for utilizing one or more of the magazines for packages of a first price (twenty-five cents, for example), one or more of the magazines for packages of a second price (thirty cents, for example), and one or more of the magazines for packages of a third price (thirty-five cents, for example). It will be understood however, that the invention is not limited to use in conjunction with cigarette vending machines, and may be used in conjunction with a machine for vending other items.

Figure 1:
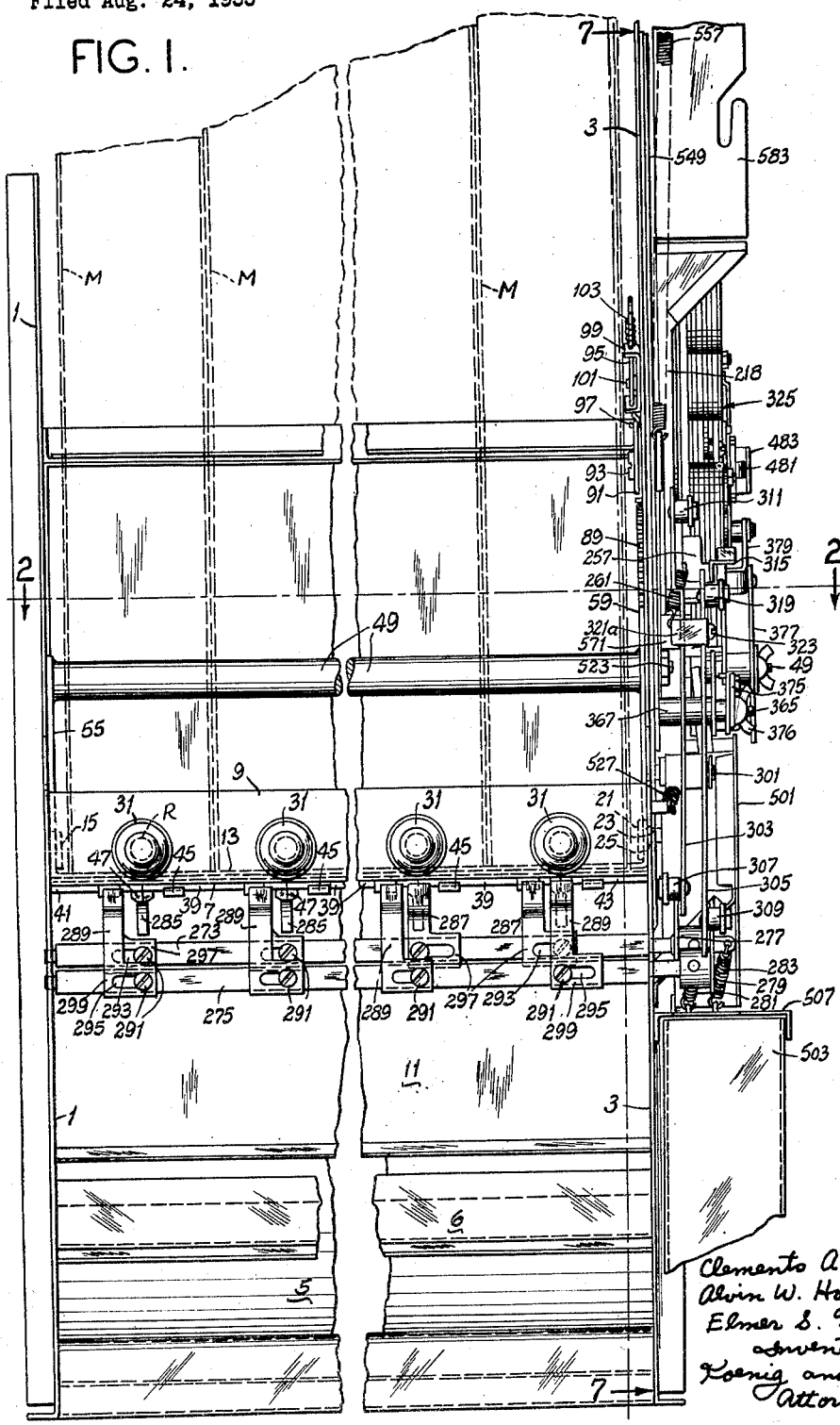
Figure 2:
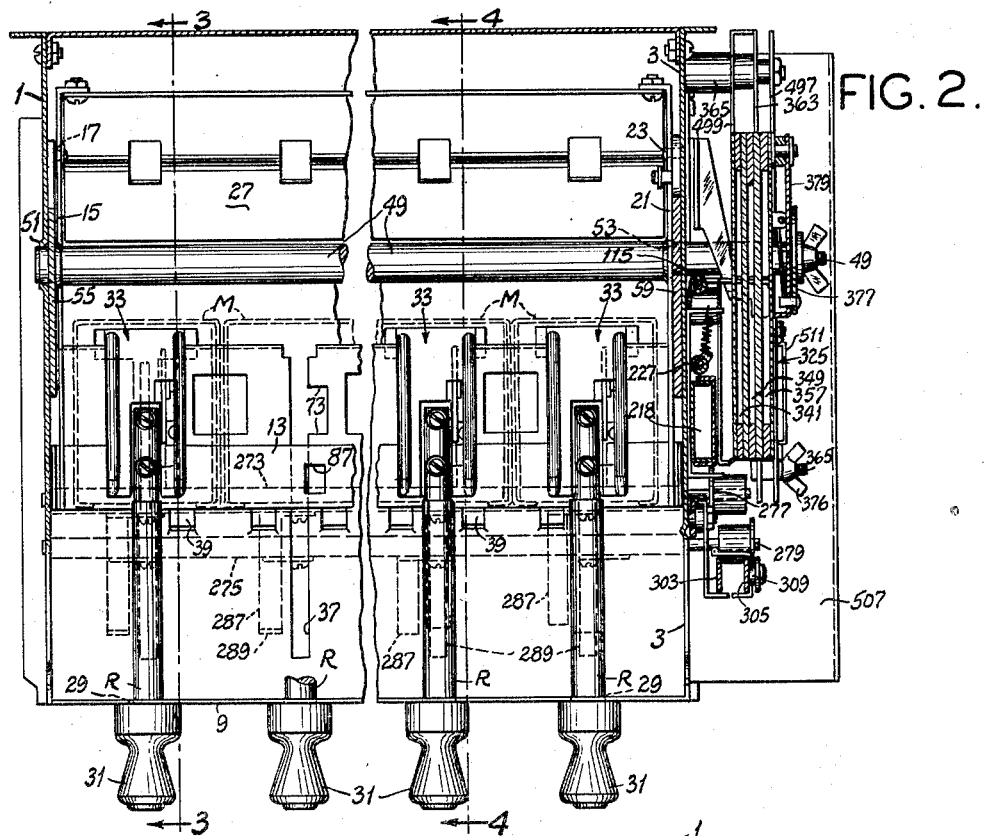
Fig. 2 is a horizontal section taken on line 2—2 of Fig. 1.

Referring to the drawings, first more particularly to Figs. 1–4 and 7, the invention is herein disclosed as it refers to a cigarette vending machine comprising left and right side walls 1 and 3. As shown in phantom, vertical magazines M for packages P of cigarettes are located in the space between the walls. For each magazine there is a selector or pull-out rod R. Four magazines and four rods R are shown in Figs. 1 and 2, but it will be understood that the apparatus will usually have more than four, and may even have only three (but no less than three). A receiver 5 extends between the walls 1 and 3 at the bottom of the apparatus to receive a package dispensed from any one of the magazines. Extending between the side walls at the front of the apparatus above the receiver is a guard plate 6 and above the latter is a fixed horizontal plate 7. This plate 7 has an upwardly extending front flange 9 and a downwardly extending rear flange 11. On the plate 7 is a draw bar 13 which extends from one side wall to the other. The draw bar is slidable on plate 7 transversely with respect to its own length, and in forward and rearward direction with respect to the apparatus. Extending rearward from the left end of the draw bar 13 (as viewed from the front of the apparatus) is a horizontal arm 15 (see Figs. 3 and 4) having a stud 17 slidable in a horizontal slot 19 in the left side wall 1. Extending rearward from the right end of the draw bar 13 is a horizontal arm 21 (see Fig. 7) having a stud 23 slidable in a horizontal slot 25 in the right side wall 3. Extending between the rear ends of the arms 15 and 21 is an apron 27.

Figure 3:
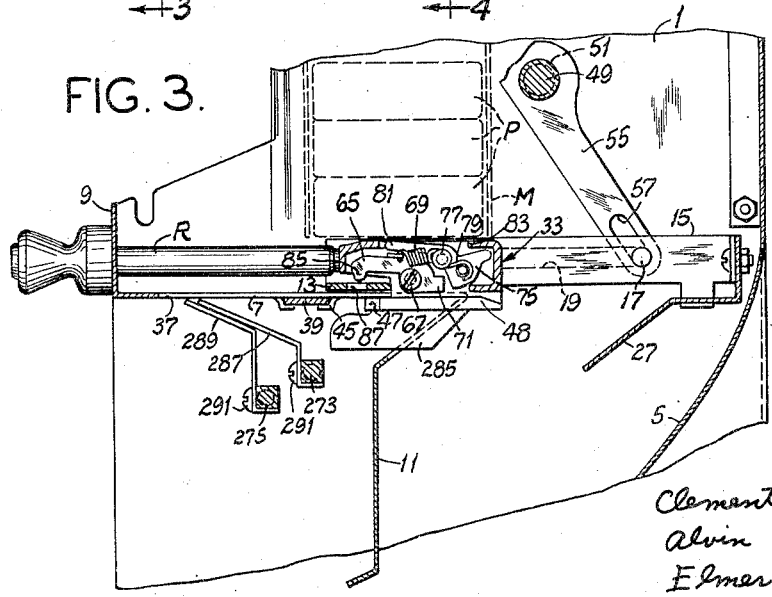
Fig. 3 is a vertical section taken on line 3—3 of Fig. 2.
Figure 7:
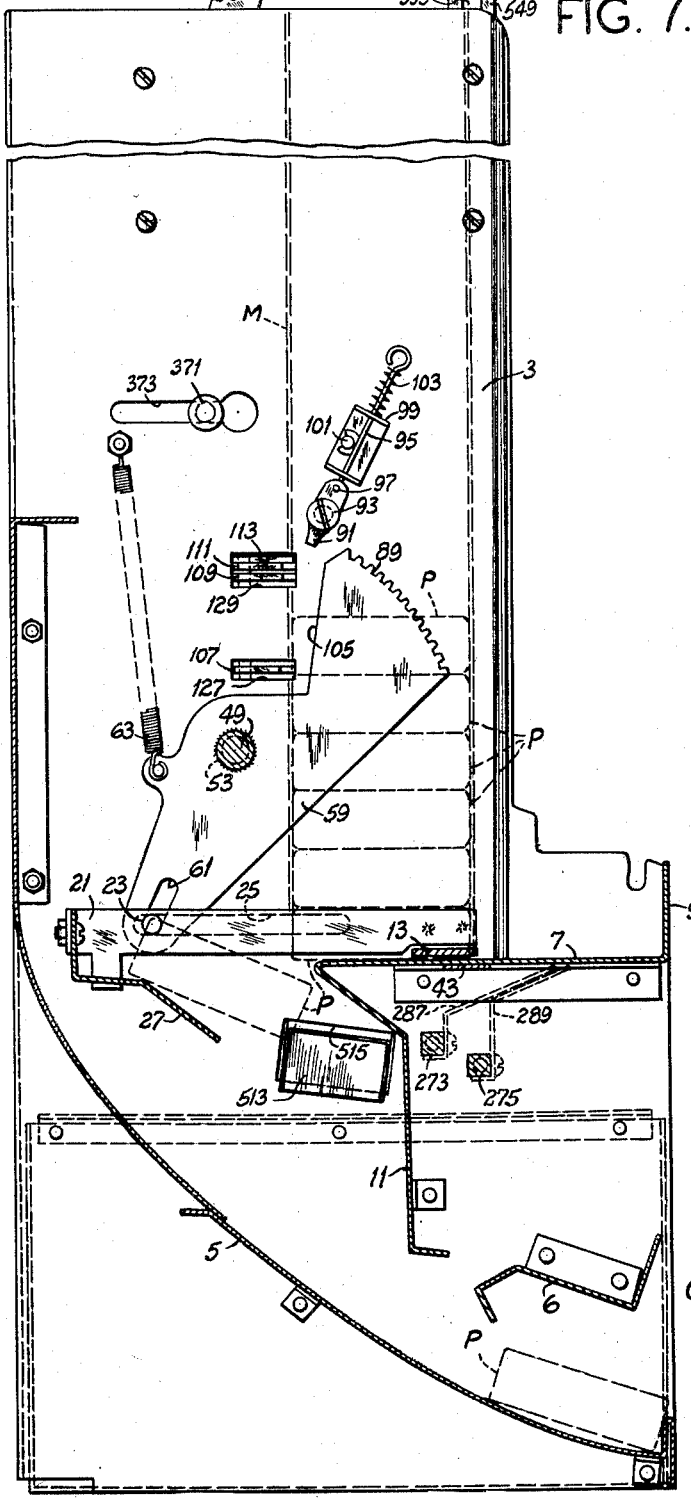
Fig. 7 is a vertical section taken on line 7—7 of Fig. 1.

The draw bar 13 is adapted to be moved from the rearward retracted position illustrated in Figs. 2, 3 and 7 toward the front of the apparatus (toward the front flange 9 of plate 7) by pulling out any one of the selector rods R. Each rod R extends through an opening 29 in the flange 9 and has a knob 31 on its outer end. Fixed on the inner end of each rod R is a head 33. Each head has a top flange 34 and a vertical web 35 which extends down through a slot 37 in the plate 7. The forward ends of the webs 35 engage the rearward edge of the bar 13

(see Figs. 3–6). Lock-out means is provided to prevent puling out more than one rod R at a time. This is shown to comprise a series of interlock tumblers 39 mounted to be slidable laterally of the apparatus under the plate 7 between end stops 41 and 43. The tumblers are guided by ears 45 struck from the plate 7. Each of the heads 33 has a nose 47 at the forward end of a horizontal flange 48 at the bottom of the web 35. Flange 48 is below plate 7. The arrangement is such that when any one rod R is pulled out, the respective nose 47 spreads the entire series of tumblers apart to lock all the other rods R against being puled out. The construction of the tumblers is similar to that shown in U. S. Patent 2,377,413, and since the details thereof do not form a part of this invention, will not be further described.

Figure 4:
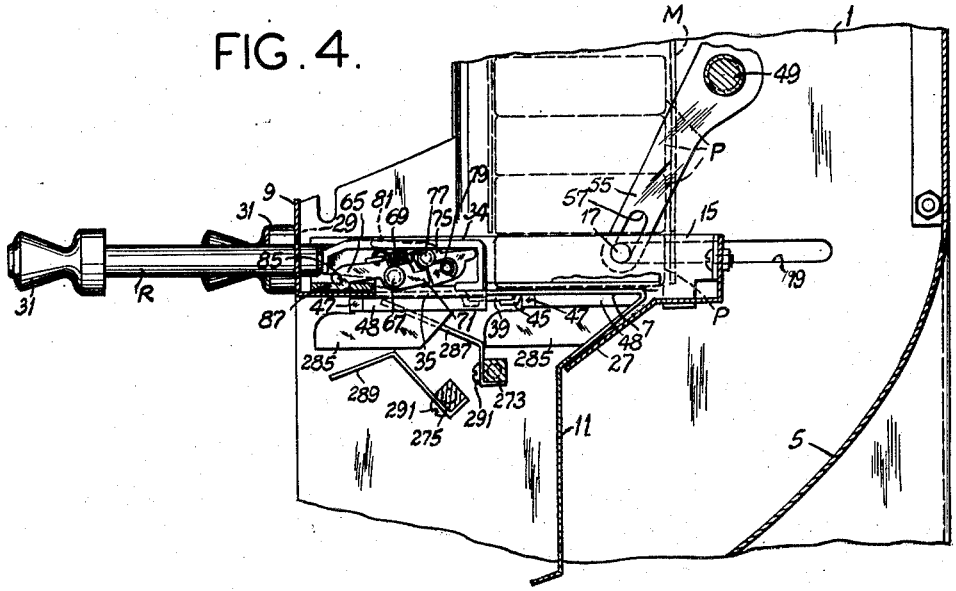
Fig. 4 is a vertical section taken on line 4—4 of Fig. 2, showing a selector of the apparatus pulled out.
Figure 17:
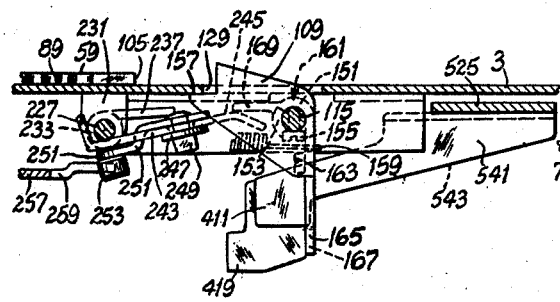
Figure 18:
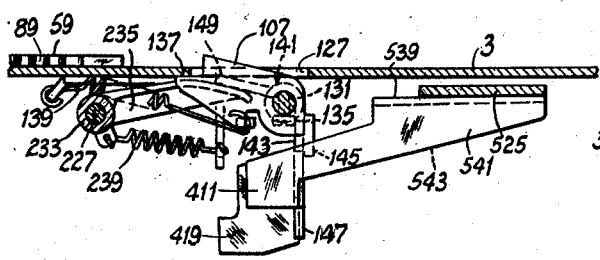

A shaft 49 extends between the side walls 1 and 3 in the rear of the magazines M, being journalled at its ends in openings 51 and 53 in the side walls 1 and 3, respectively. Fixed on the shaft on the inside of the left side wall 1 is a lever 55 (Figs. 3 and 4). This lever has a slot 57 receiving the stud 17. Lever 55 is provided for a match book dispensing mechanism, which is not shown since it is not a part of this invention. Fixed on the shaft 49 on the inside of the right side wall is a control lever 59 (Fig. 7). This has a slot 61 receiving the stud 23 on arm 21. A tension spring 63 biases the lever 59 and shaft 49 to turn clockwise as viewed in Fig. 7. This biases the draw bar 13 rearward, thereby normally holding the draw bar and all the rods R in the rearward retracted position illustrated in Figs. 2, 3 and 7 wherein the knobs engage the front flange 9 of plate 7.

When any given rod R is in its retracted position, its head 33 is located under the respective magazine (see Fig. 3). Each magazine is adapted to hold a stack of packages P, with the stack bearing on the respective head 33. Upon pulling out a rod R, the respective head 33 moves out from under the respective stack of packages, and the stack drops down onto the plate 7 (see Fig. 4). On return of the rod R to its retracted position, the bottom package of the dropped stack is pushed rearward off the plate 7, and this package falls off the apron 27 into the receiver 5 (see Fig. 7). Associated with each head 33 is means for preventing pull-out of the respective rod R if the respective magazine M is empty. This means comprises a lever 65 pivoted at 67 on the right side of the head. This lever is biased by a spring 69 toward a locking position (see Fig. 5) in which its rearward end 71 is adapted to engage the forward end of a slot 73 in the plate 7 to lock the rod R against being pulled out. The lever 65 is adapted to be latched in its locking position by a package-controlled latch 75 pivoted at 77 on the right side of the head. Latch 75 is biased by a spring 79 toward a latching position (see Fig. 5) in which it holds the lever 65 in locking position. Latch 75 has a finger 81 which, in the latching position of 75, extends above the head 33 through a slot 83 in the top flange 34 of the head. The stack (one or more packages) in the magazine holds the finger 81 down when the rod R and head 33 are in retracted position, thereby to hold the latch 75 in a retracted position (see Fig. 3), freeing the lever 65 for rocking counterclockwise as viewed in Figs. 3–5 when its rearward end 71 engages the forward end of slot 73.

Figure 5:
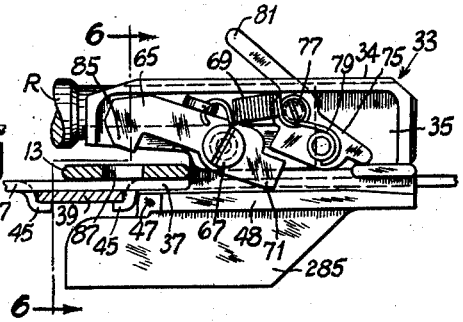
Fig. 5 is an enlarged fragment of Fig. 4, showing parts in a moved position.
Figure 6:
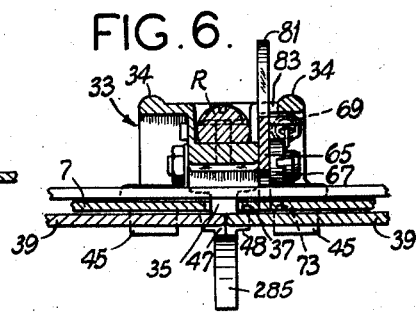
Fig. 6 is a section taken on line 6—6 of Fig. 5.

Assuming that there is at least one package in the magazine so that the latch 75 is held in its retracted position, upon pulling out the rod R the lever 65 is permitted to rock counterclockwise from its locking position shown in Fig. 5 to the retracted position shown in Fig. 4 when its rearward end 71 engages the forward end of slot 73. The lever 65 has a downwardly projecting nose 85 at its forward end which then enters an opening 87 in the draw bar 13. When the head moves out from under the stack of packages, the latch 75 is held in its retracted position by the lever 65 (see Fig. 4). If the magazine is empty, the latch 75 occupies its latching position (Fig. 5) when the head 33 is in retracted position. If an attempt is then made to pul out the rod R, lever 65 is latched in its locking position and the rearward end 71 of lever 65 engages the forward end of slot 73 to prevent the rod from being pulled out.

When all the rods R are in retracted position, and when the draw bar 13 hence is in its rearward retracted position, the lever 59 occupies the retracted position illustrated in Fig. 7. The upper end of the lever 59 is formed with ratchet teeth as indicated at 89. At 91 is shown a latching pawl for the lever pivoted on the inside of wall 3 by means of a stud 93. The pawl is normally held in the position shown in Fig. 7 by an overcentering spring mechanism including a rod 95 pivotally connected to the pawl at 97. The rod is slidable in a U-shaped bracket 99 pivoted on the inside of the wall 3 by a stud 101. A spring 103 biases the rod to move outward away from the pawl. The toothed end 89 of the lever comes into engagement with the pawl when the lever is swung counterclockwise from its retracted position as viewed in Fig. 7. This precludes return movement of the lever, unless the lever swings far enough for its toothed end 89 to move rearward clear of the pawl 91. This compels full-stroke operation of any rod R once it has been pulled out far enough for engagement of the teeth with the pawl. However, any rod R may be pulled out a short distance before the pawl engages the teeth.

The lever 59 has a shoulder 105 adapted, upon counterclockwise movement of the lever through a small angle from its retracted position illustrated in Fig. 7, for engagement with one or more of four coin-controlled tumblers or stops 107, 109, 111, 113 (see Figs. 9–11 and 13–18). Stops 107, 109 and 111 normally occupy an operative position in the path of the lever 59, but stop 113 normally occupies a retracted position out of the path of the lever 59. Each of the four stops is rotary on a vertical rod 115 mounted on the outside of the side wall 3. Rod 115 is itself mounted for rotation in openings in an upper horizontal flange 117 on an upper bracket 119 and in upper and lower horizontal flanges 121 ad 123, respectively, on a lower bracket 125. These brackets are spot-welded as indicated at S on the outside of wall 3. Stop 107 (which is the lowermost stop) in its operative position projects through a lower opening 127 in the side wall 3. Stops 109, 111 and 113, in their operative position, project through an upper opening 129 in the side wall 3. When any stop is in its operative position, all the selector rods R are locked against being pulled out any more than a small distance corresponding to the small angle through which lever 59 may turn before its shoulder 105 engages any stop. This small movement of the lever is not sufficient for the toothed end 89 of the lever to latch onto the pawl 91. In order that any rod may be completely pulled out for full-stroke operation, it is necessary that all four stops be in their retracted position out of the path of the lever 59.

The stop 107 (see Figs. 13 and 18) comprises a horizontal plate on the upper end of a hub 131 rotary on the rod 115 below the flange 123. The hub 131 has an opening 133 receiving a stud 135 extending radially from the rod 115. The operative locking position of the stop 107 (which is its normal position) is determined by engagement of a shoulder 137 on the stop with the bounding edge of the wall 3 at the forward side of the opening 127. The stop 107 is biased toward its operative position by a spring 139. It is moved counterclockwise as viewed in Fig. 18 away from its operative position either upon counterclockwise rotation of the rod 115, in which case the stud 135 engages the hub 131 to rotate the stop, or upon clockwise rotation of a lever 141 which is rotary on the rod 115 below the hub 131. Lever 141 has a shoulder 143 engageable with a finger 145 on the hub 131 for this purpose. Lever 141 has arms 147 and 149. Arm 149 extends forward and is engageable with the outside of the wall 3 to determine a normal position of the arm 147 projecting outward from the side wall 3 approximately at right angles to the wall 3. Spring 139 acts to maintain arm 147 in its stated normal position.

The stop 109 (see Figs. 13 and 17) comprises a horizontal plate on the upper end of a hub 151 which is rotary on the rod 115 below the flange 121. The hub 151 has an opening 153 receiving a stud 155 extending radially from the rod 115. The operative locking position of the stop 109 (which is its normal position) is determined by engagement of a shoulder 157 on the stop with the bounding edge of the wall 3 at the forward side of the opening 129. The stop 109 is biased toward its operative position by a spring 159. It is adapted to be moved counterclockwise as viewed in Fig. 17 away from its operative position either upon counterclockwise rotation of the rod 115, in which case the stud 155 engages the hub 151 to rotate the stop, or upon clockwise rotation of a lever 161 which is rotary on the rod 115 below the hub 151. Lever 161 has a part 163 engageable with the hub 151 for this purpose. The hub 151 has an arm 165. The lever 161 has arms 167 and 169 approximately at right angles. With the stop 109 in its operative position, arm 165 projects outward from the side wall 3 approximately at right angles to the wall. Arm 169 is engageable with the outside of the wall 3 to determine a normal position of the arm 167 projecting outward from the side wall 3 approximately at right angles to the wall. Spring 159 acts to maintain the arm 167 in its normal position.

The stop 111 (see Figs. 13 and 16) comprises a horizontal plate rotary on the rod 115 and having a connection with the lower end of a finger 170 extending down from a hub 171 rotary on the rod 115 between the flanges 117 and 121. The hub 171 has a lower arm 173 and an upper arm 175 which, in the operative locking position of the stop 111, project outward from the side wall 3 approximately at right angles to the wall 3. The operative position of the stop 111 is determined by the engagement of a shoulder 177 on the stop 111 with the bounding edge of the wall 3 at the forward side of the opening 129. A spring 178 biases the stop 111 to move toward its operative position. The hub 171 also has a forwardly extending arm 179 (see Fig. 14).

The stop 113 (see Figs. 13 and 15) comprises a horizontal plate on the lower end of a hub 181 rotary on the rod 115 below the hub 171. The hub 181 has an opening 183 receiving a stud 185 extending radially from the rod 115. The stop 113 carries a cam follower roller 187. A lever 189 (see Figs. 9–11) is pivoted at 191 on the outside of the side wall 3. At its lower end, the lever 189 is formed as a cam 193 (see Fig. 15) for cooperation with the cam follower roller 187 normally to hold the stop 113 in its retracted position shown in solid lines in Fig. 15. A spring 195 biases the stop 113 to move toward its operative position in which it projects through the opening 129 for engagement by the shoulder 105 of the lever 59 (see the dotted line position of 113 in Fig. 15). The stop 113 is released for swinging to its operative position upon counterclockwise movement of the lever 189 from its normal position shown in Fig. 9. When lever 189 returns to its normal position, the cam 193 engages the cam follower roller 187 to move the stop 113 back to its retracted position.

Fixed on the upper end of the rod 115, above the flange 117, is a plate 197 having a portion thereof bent to provide an arm 199. This arm has an operative position in which it projects toward the right outward from the side wall 3. The plate has an arm 201 engageable with the side wall 3 to determine this operative position of the arm 199. A spring 203 biases the arm 199 toward its operative position. Pivoted at 205 on the plate 197 is a lever 207, having its lower end engageable behind the arm 175.

Pivoted at 211 on the outside of the side wall 3 is a lever 213. This has an inwardly bent finger 215 which, in the normal position of the lever 213, is engageable with the rearward edge of the upper end of the lever 207 (see Fig. 9). Lever 213, at its forward end, has a downwardly angled extension 217. The extension is confined between a slug chute 218 and a guide 219, the latter permitting rocking of lever 213 within limits. The lever 213 is biased to rock counterclockwise, as viewed in Figs. 9–11, by spring 220. It normally occupies the position shown in Fig. 9, determined by its engagement with the lower end of the guide 219. The lever 213 carries a roller 221 engageable with an inclined ear 223 at the upper end of the lever 189. Lever 189 is biased to rock clockwise, as viewed in Figs. 9–11, by a spring 225. The arrangement is such that when the lever 213 is swung clockwise from its normal position shown in Fig. 9 and raised to the position shown in Figs. 10 and 11, the roller 221 engages the ear 223 to rock the lever 189 counterclockwise against the bias of spring 225 from the normal position shown in Fig. 9 to the moved position shown in Figs. 10 and 11.

A rod 227 is journalled at its upper end in a bracket 229 and toward its lower end in a bracket 231 for rotation on a vertical axis on the outside of wall 3. Rotary on the lower end of this rod 227, below the bracket 231, is a lever 233 which has a relatively long lower arm 235 and a relatively short upper arm 237. The lower arm 235 is engageable with the outer face of the arm 149 (see Fig. 18). A spring 239 biases the lever 233 counterclockwise as viewed from above to the normal position for arms 235 and 237 shown in Figs. 17 and 18.

Fixed on the rod 227 above the bracket 231 is a plate 243. Plate 243 is formed with a finger 245 which engages on the outside of the arm 169 (see Fig. 17). Pivoted at 247 on the plate 243 is a bell crank lever having a downwardly extending arm 249 and a forwardly extending arm 251 carrying a roller 253. Pivoted at 255 on the slug chute 218 is a lever 257 having a slot 259 in its rearward end receiving the roller 253. A spring 261 biases the lever 257 to swing counterclockwise, as shown in Figs. 9–11, to the normal retracted position shown in Fig. 9. This retracted position is determined by the engagement of the arm 251 of the bell crank lever with a shoulder 263 on the plate 243. In this retracted position of the bell crank lever, its arm 249 is located on the outside of the arm 237. When the lever 257 is rocked clockwise from its retracted position shown in Fig. 9 to the position shown in Fig. 11, the bell crank lever is rocked in such manner that the arm 249 is swung rearward and clear of the arm 237.

Pivoted at 265 on the plate 243 is a lever 267. At its forward end, this lever 267 has a roller 268 which is received in a slot in a plate 269 mounted for generally vertical sliding movement on the inside of the lever 213. The plate 269 has slots 270 receiving the studs 271 fixed to the lever 213. A spring 272 biases the plate 269 upward to a normal position determined by the engagement of the lower ends of the slots 270 with the studs 271. When the lever 213 is in its normal lower position, the lever 267 has its rearward end located above and clear of the arm 179. However, when the lever 213 is rocked upward from its normal position, lever 267 is rocked clockwise from its Fig. 9 position to its Figs. 10 and 11 position in which the rearward end of the lever 267 is located behind the arm 179. The plate 243, together with the lever 249, 251 and the lever 267 is adapted to be swung outward from the side wall 3 (clockwise as viewed in Figs. 14–17) upon counterclockwise movement of either of arms 147 or 167 from their normal position. Arm 147 acts through arm 235 and arm 237 for this purpose when the bell crank lever 249, 251 is in its normal position shown in Figs. 9 and 10. However, when the bell crank lever is in the position shown in Fig. 11, the swinging of the arm 147 is not effective to cause rotation of the plate 243.

Two rock shafts 273 and 275 are journalled at their ends in the side walls 1 and 3 below the plate 7 (see Figs. 1–4, and 7–11). Shaft 275 is located in front of and somewhat below shaft 273. These shafts are hereinafter referred to as the front and rear price shafts. On the right end of the rear price shaft 273 outside of wall 3 is a cam 277. On the right end of the front price shaft 275 outside of wall 3 is a cam 279. The price shafts 273 and 275 are biased to rock clockwise as viewed in Figs. 8–11 by springs 281 and 283, respectively. The rear price shaft 273 and cam 277 are adapted to be rocked counterclockwise to the position shown in Fig. 10 when any rod R for dispensing an item of the second price (thirty cents, for example) is pulled out. The front price shaft 275 and cam 279 are adapted to be rocked counterclockwise to the position shown in Fig. 11 when any rod R for dispensing an item of the third price (thirty-five cents, for example) is pulled out. Each of the heads 33 has a lower vertical rib 285. As to any rod or rods R for items of the second price, the rib 285 on the head 33 of any one of these rods is engageable with an arm 287 on the shaft 273 when the rod is pulled out, thereby to rock the shaft 273 counterclockwise against the bias of spring 281. As to any rod or rods R for items of the third price, the rib 285 on the head 33 of any one of these rods is engageable with an arm 289 on the shaft 275 when the rod is pulled out to rock the shaft 275 counterclockwise against the bias of spring 283.

For convenience, an arm 287 is provided on shaft 273 for every one of the rods R, and an arm 289 is provided on shaft 275 for every one of the rods R. As to those rods for dispensing items of the first price (twenty-five cents, for example), the arms 287 and 289 are positioned to lie out of the path of the respective ribs 285. Thus, neither shaft 273 nor shaft 275 is rocked when a rod for an item of the first price is pulled out. As to those rods for dispensing items of the second price, the arms 287 are positioned to lie in the path and the arms 289 are positioned to lie out of the path of the respective ribs 285. As to those rods for dispensing items of the third price, the arms 289 are positioned to lie in the path and the arms 287 out of the path of the respective ribs 285. This makes it possible to utilize any of the rods R for either first, second or third price items, as desired.

The arms 287 and 289 are attached to the shafts 273 and 275 by set screws 291 threaded in tapped holes in the shaft and extending through elongate slots 293, 295 in base portions 297, 299 of the respective arms, allowing the arms to be shifted on the shafts either into or out of position for engagement by ribs 285. Fig. 1 shows the first two rods at the left for items of the first price, the third rod from the left for an item of the second price, and the rod at the right for an item of the third price. The arms 287 and 289, shafts 273 and 275 and cams 277 and 279 normally occupy the retracted position shown in Figs. 3, 7, 8 and 9 determined by engagement of the ends of the arms 287 and 289 with the bottom of plate 7.

A stud 301 extends outward from the side wall 3. Levers 303 and 305 are pivoted on this stud, with lever 305 on the outside. Lever 303 has a roller 307 at its lower end engageable by the cam 277 for swinging the lever 303 clockwise as viewed in Figs. 8 and 9 when the cam 277 rotates counterclockwise. Lever 305 has a roller 309 at its lower end which is engageable by the cam 279 for swinging the lever 305 clockwise as viewed in Figs. 8 and 9 when the cam 279 is swung counterclockwise. At its upper end above the stud 301, the lever 303 has a roller 311 which engages the lower end edge 313 of the extension 217 of the lever 213. This edge 313 is inclined in such manner that when the lever 303 is swung clockwise from its normal retracted position illustrated in Figs. 8 and 9, the lever 213 is rocked clockwise on its pivot 211 from the retracted position shown in Figs. 8 and 9 to the raised position shown in Figs. 10 and 11.

The lever 303 is normally maintained in its retracted position by the bias of the spring 220 acting through the lever 213.

The lever 257 has a forward end portion 315 formed to provide a cam as indicated at 317 and an upper inclined lip 318. The lever 305 at its upper end above the stud 301 has a roller 319. When the lever 305 swings clockwise from its retracted position illustrated in Fig. 9, the roller 319 engages the cam 317 to rock the lever 257 clockwise. Lever 305 carries a clip 321 having a long finger 321a and a short finger 321b (see Fig. 9A). In the case of the twenty-five cent, thirty cent, thirty-five cent set-up, the long finger 321a extends in front of and is engageable with the forward edge of the lever 303. Thus, lever 303 may swing clockwise independently of lever 305 when cam 277 is rocked counterclockwise, but when lever 305 swings clockwise upon counterclockwise movement of the cam 279, the lever 303 is swung clockwise along with it. A stop for limiting counterclockwise movement of the lever 303 is indicated at 322. The clip 321 is removably fastened to the lever 305 by a screw 323 and has an extra screw hole 324 whereby it may be reversed in position on lever 305 for the long finger to extend in the rear of and spaced from the lever 303 (see Figs. 9B and 9C) for the purpose of changing the price set-up, as will be made clear.

A coin receiver, generally designated 325, is slidable forward and rearward outside of the mechanism on the outside of wall 3. The coin receiver includes an inside plate 327, two intermediate plates 329 and 331 and an outside plate 333. Sandwiched between the inside plate 327 and the adjacent intermediate plate 329 are spacers 335 and 337 (see Fig. 20) which define an inclined upper quarter chute 339 having an entrance at the upper end of the coin receiver and opening at its lower end to a wide chute section 341. Sandwiched between the two intermediate plates 329 and 331 are spacers 343, 345 and 347 (see Fig. 21) which define an inclined dime chute 349 having an entrance at the upper end of the receiver and leading to a wide chute section 351. Sandwiched between the intermediate plate 331 and the outside plate 333 are spacers 353 and 355 (see Fig. 23) which define an inclined nickel chute 357 having an entrance at the upper end of the receiver and leading to a wide chute section 359. Spacers 353 and 355 have portions which extend below the assembly of the plates and which carry headed studs 361.

A plate 363 is mounted on the outside of side wall 3 by means of studs 365 with spacing means 367 thereon. The plate 363 has a pair of horizontal keyhole slots 369 which receive the headed studs 361. The coin receiver 325 also has a grooved stud 371 which is slidable in a horizontal keyhole slot 373 in the wall 3. The coin receiver 325 normally occupies the forward retracted position in which it is shown in Fig. 8. This position is determined by the engagement of the downward extension of spacer 353 with a stop indicated at 375. The stop is removably held on one of the studs 365 by a wing nut 376. The coin receiver is movable rearward from its forward retracted position and then back to said position by means of a crank 377 fixed on the outer end of the shaft 49, and a link 379 connecting the crank and the coin receiver. The arrangement is such that when any rod R is pulled out, with resultant clockwise rotation of the shaft 49 and the crank as viewed in Fig. 8, the receiver is driven rearward from its forward retracted position. When the rod R returns to its retracted position, the receiver 325 is moved forward and returned to its retracted position.

A quarter entering the quarter chute 339 rolls down this chute to the position indicated at Q in Fig. 20 resting on a quarter support 381 and located between a pair of pins 383 and the arm 199. This arm 199 extends through an opening 385 in the assembly of plates 327, 329, 331 and 333 into the space between the inside plate 327 and the intermediate plate 329. It does not reach into the dime and nickel chutes. If a second quarter should be deposited in chute 339, it is deflected by the first quarter to the right of the pins 383 as illustrated in Fig. 20 and drops out of the coin receiver.

In the wide dime chute section 351 there is an upper dime deflector 387 pivoted at 389 and a lower dime deflector 391 pivoted at 393. The upper deflector 387 is normally gravity-biased to the position shown in Fig. 21, determined by its engagement with a pin 395. Below the upper deflector 387, the chute section 351 is divided by a series of pins 397 into two chutes 399 and 401. The deflector 387 is so shaped that when in its normal position illustrated in Fig. 21 it intercepts a first dime as it drops out of the chute 349, then swings counterclockwise on its pivot 389 as viewed in Fig. 21 to the deflecting position illustrated in Fig. 22 determined by the engagement of an arm 403 on the deflector with the pin 395. The intercepted dime, upon the stating swinging of the deflector 387, rolls down the arm 403 to the position indicated at D–1 in Fig. 22 resting on a first dime support 405 and located between the arm 403 and the arm 175. The arm 175 reaches through an opening 407 in all four plates of the coin receiver.

A second dime dropping out of the chute 349 is deflected by the upper deflector 387 to the right of the deflector 387 as viewed in Fig. 22. This second dime falls downward in the chute 401 and bounces off an abutment 409 between the series of pins 397 and the deflector 391. The dime rocks the deflector 391 from the position shown in Fig. 21 to the position shown in Fig. 22, and comes to rest on a lower dime support 411 in position D–2 between an arm 413 on the deflector 391 and the arm 167. The arm 167 reaches through an opening 415 in all four plates of the coin receiver. The Fig. 22 position of the lower deflector 391 is determined by the engagement of its arm 413 with a pin 417. The deflector 391 is normally gravity biased to the position shown in Fig. 21. If a third dime should be deposited in the dime chute 349, it passes to the right of the upper deflector 387, then to the left of the abutment 409, and then is deflected by the lower deflector 391 to the right of the latter, thence down and out of the coin receiver through the lower portion of chute 401.

A first nickel entering the nickel chute 357 rolls down this chute and falls through the wide portion 359 to the position indicated at N–1 in Fig. 24, resting on a nickel support 419 and located between a pin 421 and the arm 147. This arm 147 reaches through an opening 422 in all four plates of the coin receiver. A second nickel comes to rest on the first nickel in the position indicated at N–2 in Fig. 24 located between the lower arm 423 of a toggle lever 425 and the arm 167. The toggle 425 is pivoted at 426 and has an upper arm 427 and a bent finger 429 which extends outward through an arcuate slot 431 in the plate 333 and then forward. A third nickel comes to rest in the position designated N–3 on the second nickel located between the lower end portion 433 of a lever 435 and the arm 165. The arm 165 reaches through an opening 436 in all four plates of the coin receiver. The lever 435 has a pivot pin 437 which extends through a slot 439 in the outer plate 333. The lower end 433 of the lever 435 is adapted for engagement by the upper arm 427 of the toggle 425. A fourth nickel comes to rest in the position designated N–4 located between the lower arm 441 of an upper toggle lever 442 and the arm 173. The arm 173 reaches through an opening 443 in all four plates of the coin receiver. The upper toggle 442 is pivoted at 444 and has an upper arm 445 and a bent finger 447 which extends outward through an arcuate slot 449 in the plate 333 and then forward. Its lower arm 441 is adapted for engagement by the upper end 451 of the lever 435. A fifth nickel comes to rest in the position designated N–5 on the fourth nickel and located between the upper arm 445 of the upper toggle 442 and the arm 175. A sixth nickel is deflected by the fifth nickel to the right of the members 442, 435 and 425 as viewed in Fig. 24 and falls out of the coin receiver.

Pivoted at 453 on the outside of the plate 333 is a member 455 (see Fig. 8) having a forwardly directed nose 457 at its lower end. This member carries the pivot pin 437 of the lever 435. Pivoted at 459 on the outside of the plate 333 is a lever 461 having a recess 463 at its rearward end which receives the nose 457. The lever 461 at its rearward end is adapted to bear down on the finger 429 of the lower toggle 425. Pivoted at 465 on the outside of the plate 333 is a member 467 which biases downward on the finger 447 of the upper toggle 442 by gravity.

Upon rearward movement of the coin receiver 325 from its retracted position, a first nickel at N–1, being backed by the pin 421, is moved rearward with the coin receiver. Being in engagement with the arm 147 of lever 141, it rotates the lever 141 counterclockwise as viewed from above (and as viewed in Fig. 18). The shoulder 143 on the lever 141 engages finger 145 on the hub 131 to rotate the hub 131 and the stop 107 counterclockwise, thereby moving the stop 107 to a retracted, nonlocking position. Assuming that there are nickels at N–1 and N–2, and that lever 461 is free to rotate counterclockwise as viewed in Fig. 8, upon rearward movement of the coin receiver 325 the second nickel (at N–2) is held back by arm 167 and lags behind the first nickel, the toggle lever 425 rocking counterclockwise as viewed in Fig. 24 to the point where finger 429 of the toggle lever engages the upper end of the slot 431. This rocking of the toggle lever 425 is permitted by lever 461 being free. Accordingly, the second nickel is ineffective to move the arm 167 during the initial phase of rearward movement of the coin receiver. Assuming that there are nickels at N–1, N–2 and N–3, the second and third nickels (at N–2 and N–3) are both locked against lagging behind because the third nickel acts through the lever 435 to hold the toggle lever 425 against rocking. Accordingly, the second and third nickels are effective to move arms 167 and 165. Assuming that there are nickels at N–1, N–2, N–3 and N–4, and that lever 461 is free to rotate counterclockwise as viewed in Fig. 8, upon rearward movement of the coin receiver 325 the fourth nickel (at N–4) is held back by the arm 173 and lags behind the other three nickels, the toggle lever 442 rocking counterclockwise as viewed in Fig. 24 to the point where finger 447 engages the upper end of the slot 449. Upon such rocking of toggle lever 442, its lower arm 441 rocks lever 435 clockwise as viewed in Fig. 24 and causes swinging of member 455 to the point where the pivot pin 437 engages the forward end of the slot 439 (the right end of the slot 439 as viewed in Fig. 24). Accordingly, the fourth nickel is ineffective to move arm 173 during the initial phase of movement of the coin receiver. Assuming that there are nickels at N–1, N–2, N–3, N–4 and N–5, the fourth and fifth nickels (at N–4 and N–5) are both locked against lagging behind because they coact to hold the toggle lever 442 from rocking.

Assuming that there are nickels at N–1 and N–2, and that lever 461 is held against counterclockwise rotation from its Fig. 8 position, upon rearward movement of the coin receiver the second nickel (at N–2) is locked for movement with the first nickel by reason of the toggle lever 425 being locked against rocking by lever 461. Assuming that there are nickels at N–1, N–2, N–3 and N–4, and that lever 461 is held against counterclockwise rotation from its Fig. 8 position, upon rearward movement of the coin receiver the fourth nickel (at N–4) is locked for movement with the first three nickels. This occurs because lever 461 thereupon holds the member 455 from swinging away from its Fig. 8 position wherein the pivot pin 437 is at the rearward end of the slot 439, Pivoted on a vertical axis as indicated at 469 on the outside of plate 333 is a gate 471 having fingers 473, 475 and 477. The gate is biased to a normal position in engagement with the outside of the plate 333 by a spring 479. In this normal position of the gate, finger 473 reaches through opening 385 across the nickel and dime chutes into the quarter chute. It prevents a quarter from jamming in the coin receiver. Fingers 475 and 477 reach into the nickel chute, but not into the dime or quarter chute. They prevent nickels from falling out if four or five nickels are inserted, and a thirty or thirty-five cent rod pulled out. Member 471 has a rearwardly extending outwardly bent tail 481. Upon rearward movement of the coin receiver 325, tail 481 engages a cam plate 483 fixed on the wall 3 to swing the member 471 outward to retract the finger 473 from the quarter chute and to retract the fingers 475 and 477 from the nickel chute. Pivoted on a vertical axis at 485 on the outside of the plate 333 is a gate 487. This is biased by a spring 489 toward a position wherein a finger 491 thereon extends into the nickel chute for supporting a nickel in position N–2. In the case of the twenty-five cent, thirty cent, thirty-five cent set-up, the gate is held out of this position by a screw 493 threaded in the gate and engaging the outside of the coin receiver. It is also held out by the screw in the case of a twenty cent, twenty-five cent and thirty cent set-up. It is provided for use if a set-up including a price lower than twenty cents may ever be wanted, in which case the screw is backed off so that finger 491 extends into the nickel chute for supporting the first nickel at position N–2 (instead of at N–1). As regards the herein described version of the machine, however, the gate 487 may be regarded as having no function.

On the outside of the plate 363 is a plate 497 with space between these plates for nickels to fall through. On the inside of the plate 363 is a plate 499 with space between these plates for dimes and quarters to fall through. Below the assembly of plates 363, 497 and 499 and toward the rear of the apparatus is a coin chute 501 (see Fig. 8) which conducts coins falling out of the rear portion of the assembly to a money drawer 503. This drawer is slidable on a shelf 505 which extends out from the side wall 3. A cover 507 for the drawer extends out from the side wall 3. Coins fall from the chute 501 into the drawer through an opening 509 in the cover. The slug chute 218 extends down between the assembly 363, 497 and 499 toward the front of the apparatus. Below the assembly 363, 497, 499 the chute 218 has a portion 511 which projects outward under the forward portion of the assembly and is open at the top for receiving coins falling out of the forward portion of the assembly. Coins falling in chute 218 and its portion 511 are directed by an inclined lower end wall 513 of the chute through an opening 515 in the side wall 3 to the receiver 5.

A slide 517 is mounted for horizontal forward and rearward movement on the outside of side wall 3 (and on the inside of chute 218) by means of a stud 519 fastened to the side wall 3 and received in a slot 521 in the slide 517, and by means of the stud 301 received in a slot 523 in the slide. Fastened to this slide toward its rearward end is a plate 525 which extends vertically upward on the inside of assembly 363, 497 and 499, and in the rear of the brackets 119 and 125. The assembly consisting of slide 517 and plate 525 is biased forward by a spring 527 to a forward position determined by engagement of the forward edge of the plate 525 with the rearward edges of brackets 119 and 125. Fixed to the plate 525 adjacent its upper end is a bracket 529 having upper and lower flanges 531 and 533. These flanges extend forward from the plate 525. The upper flange 531 has an end portion directed outward from the side wall 3 which constitutes the quarter support 381. The latter reaches into the quarter chute in the coin receiver 325 through a horizontal slot 535. The lower flange 533 has an outwardly directed end portion which constitutes the first dime support 405. The latter reaches into the dime chute in the coin receiver 325 through a horizontal slot 537. Fixed to the plate 525 just above the slide is a bracket 539 having upper and lower flanges 541 and 543 extending forward from the plate 525. These flanges 541 and 543 have outwardly directed end portions which constitute the second dime support 411 and the first nickel support 419, respectively. The second dime support 411 reaches into the dime chute in the coin receiver through a horizontal slot 545, and the first nickel support 419 extends under the coin receiver in a notch 547 in plate 363.

The assembly consisting of slide 517, plate 525 and brackets 529 and 539 is adapted to be moved rearward by a coin return bar 549. This bar is mounted for vertical movement adjacent the forward edge of the side wall 3 by means of two upper studs 551 and a lower stud 553 fastened to the side wall and extending through elongate vertical slots 555 in the bar. The bar is biased upward to a retracted position, determined by engagement of the lower ends of the slots 555 with the studs 551 and 553, by means of a spring 557 connected to a lug on the bar. The forward end of the slide 517 is inclined as indicated at 559 for engagement by an inclined camming end 561 at the lower end of the bar 549. When the bar is moved downward, the slide 517 carrying plate 525 and brackets 529 and 539 is moved rearward against the bias of spring 527. A detent for the slide 517 is indicated at 565. This is pivoted at 567 on the wall 3. A spring for biasing the detent is indicated at 569 (see Figs. 8 and 9).

To adapt the apparatus for conversion to a twenty cent, twenty-five cent, thirty cent set-up, two brackets each designated 571 are provided on the wall 3 (see Figs. 10 and 11). Each of these is provided with a vertical slot 573. A bar 575 (see Fig. 9B) may be mounted in these slots for forward and rearward sliding movement. Removably attached to the bar at its rearward end is a member 577 having an upper extension 579 engageable with the finger 145. The bar 575 has a lug 581 engageable with the rearward bracket 571 to limit its rearward movement. The function of the bar will be later described. The bar is not used in the case of the twenty-five cent, thirty cent, thirty-five cent set-up, hence does not appear elsewhere than Figs. 9B and 9C.

It will be understood that the vending machine will have a coin slot for nickels, dimes and quarters. Coins deposited in this slot will enter a coin selector and slug rejector (not shown) for delivering a nickel to the nickel chute 357 of the coin receiver 349 of the receiver, and for delivering a quarter to the quarter chute 339 of the receiver when the receiver is in its retracted position shown in Fig. 8. Brackets for mounting the coin selector and slug rejector device are indicated at 583 and 585. The coin selector and slug rejector device rejects coins of improper denominations and spurious coins. Such rejected coins drop out of the device into the upper end of chute 218. Coin selector and slug rejector devices suitable for the purpose are known; see, for example, U. S. Patent 2,292,628.

Operation is as follows:

As shown, the apparatus is set up for vending twenty-five cent, thirty cent and thirty-five cent items, Fig. 1 showing the first two rods R at the left for twenty-five cent items, the third rod from the left for thirty cent items, and the rod at the right for thirty-five cent items. To obtain a twenty-five cent item, the purchaser may deposit either a quarter, two dimes and one nickel, one dime and three nickels, or five nickels.

A quarter deposited in the coin slot of the machine is delivered by the coin selector (not shown) to the quarter chute 339 of the coin receiver 325. The quarter comes to rest at position Q (Fig. 20) on the quarter support 381 between the pins 383 and the arm 199. On pulling out a twenty-five cent selector rod R (such as one of the two rods R at the left of Fig. 1), the draw bar 13 is moved forward. This pulls arm 21 forward and rocks the lever 59 counterclockwise as viewed in Fig. 7. Upon such rocking of the lever 59, the lever shaft 49 rotates clockwise as viewed in Fig. 8, and acts through the crank 377 and the link 379 to move the coin receiver 325 rearward. The quarter at position Q, engaging the arm 199, rotates the rod 115 counterclockwise as viewed from above. Upon such rotation of the rod 115, stud 135 engages the hub 131 of stop 107 to rotate this stop to a retracted non-locking position. Stud 155 engages the hub 151 of stop 109 to rotate this stop to a retracted non-locking position. The upper end of lever 207 engages the finger 215 of lever 213, lever 207 rocks counterclockwise as viewed in Fig. 9, and its lower end engages arm 175 to rotate the stop 111 to a retracted non-locking position. Stop 113 is already in a retracted non-locking position. The movement of stops 107, 109 and 111 to retracted position occurs before the lever 59 has swung far enough to engage any one of them and before the lever engages the pawl 91. Accordingly, the twenty-five cent selector rod may be completely pulled out and then allowed to return to its retracted position to obtain a twenty-five cent item. After the quarter has swung the arm 199 far enough to accomplish the retraction of the stops 107, 109 and 111, it slides past the free end of the arm 199 and as the coin receiver 325 reaches the rearward end of its stroke the quarter falls off the support 381 and down through the quarter chute 339 and out of the receiver 325 into the chute 501 and through the opening 509 in the cover 507 into the money drawer 503.

Assuming that two dimes and one nickel are deposited in the coin slot of the machine to obtain a twenty-five cent item, the dimes are delivered by the coin selector to the dime chute 349 and the nickel is delivered to the nickel chute 357 of the coin receiver 325. The first dime comes to rest at position D–1 on the first dime support 405 and the second dime comes to rest at position D–2 on the second dime support 411 (Fig. 22). The first dime at D–1 is lodged between the arm 403 (backed by pin 395) and the arm 175. The second dime is lodged between the arm 413 (backed by pin 417) and the arm 167. The nickel comes to rest at position N–1 on the nickel support 419 (Fig. 24), lodged between pin 421 and the arm 147. On pulling out a twenty-five cent selector rod, with resultant rearward movement of the coin receiver 325, the first dime at D–1 engages the arm 175 to rotate the stop 111 counterclockwise as viewed from above (and as viewed in Fig. 16) to a retracted non-locking position. The second dime at D–2 engages the arm 167 to rotate the lever 161 counterclockwise as viewed from above. Part 163 on lever 161 engages the hub 151 to rotate the stop 109 to a retracted non-locking position. The nickel at N–1 engages the arm 147 to rotate the lever 141 counterclockwise as viewed from above. The shoulder 143 on lever 141 engages the finger 145 on the hub 131 to rotate the stop 107 to a retracted non-locking position. Movement of the stops 107, 109 and 111 to retracted position ocurs before the lever 59 has swung far enough to engage any one of them, and before the lever engages the pawl 91. The stop 113 is already in a retracted non-locking position. Accordingly, the twenty-five cent selector rod may be completely pulled out and then allowed to return to its retracted position to obtain a twenty-five cent item. As the coin receiver moves rearward, the dimes slide past the free ends of arms 167 and 175, and the nickel slides past the free end of arm 147. As the coin receiver reaches the rearward end of its stroke, the nickel falls off the nickel support 419 and the dimes fall off the supports 411 and 405, and all these coins drop out of the coin receiver into the chute 501 and thence into the money drawer.

Assuming that one dime and three nickels are deposited in the coin slot of the machine to obtain a twenty-five cent item, the dime is delivered by the coin selector to the dime chute 349 and the nickels are delivered to the nickel chute 357 of the coin receiver 325. The dime comes to rest at position D–1. The nickels comes to rest at positions N–1, N–2 and N–3. On pulling out a twenty-five cent selector rod, with resultant rearward movement of the coin receiver 325, the dime at D–1 acts to move the stop 111 to a retracted non-locking position as previously described. The first nickel at position N–1 acts to move the stop 107 to a retracted non-locking position as previously described. The second and third nickels at positions N–2 and N–3, which are both locked to move with the nickel at N–1 as previously described, act to move arms 167 and 165 and hence to move the stop 109 to a retracted non-locking position. Again, movement of the stops 107, 109 and 111 to retracted position occurs before lever 59 engages any one of them. Stop 113 is already in a retracted non-locking position, and hence the twenty-five cent selector rod may be completely pulled out. As the coin receiver reaches the rearward end of its stroke, the coins drop into the money drawer.

Assuming that five nickels are deposited in the coin slot to obtain a twenty-five cent item, all these nickels are delivered by the coin selector to the nickel chute 357 of the coin receiver 325 and come to rest at positions N–1 to N–5 as shown in Fig. 24. On pulling out a twenty-five cent selector rod, with resultant rearward movement of the coin receiver, the first nickel moves the stop 107 to a retracted non-locking position as previously described. The second and third nickels move the stop 109 to a retracted non-locking position as previously described. The fourth and fifth nickels, which are both locked to move with the other nickels as previously described, move the stop 111 to a retracted non-locking position. As before, the stop 113 is already in retracted position, and accordingly the selector rod may be completely pulled out. As the coin receiver reaches the rearward end of its stroke, all five nickels drop into the money drawer.

To obtain a thirty cent item, the purchaser must deposit a silver quarter and a nickel. The quarter comes to rest at position Q (Fig. 20) and the nickel comes to rest at position N–1 (Fig. 24). On pulling out the thirty cent selector rod, not only is the coin receiver 325 moved rearward, but also the rear price shaft 273 and cam 277 are rocker counterclockwise from the position shown in Fig. 9 to the position shown in Fig. 10. This results in swinging of the lever 303 from the Fig. 9 to the Fig. 10 position, with accompanying clockwise pivoting of the lever 213 to the raised position shown in Fig. 10. Raising the lever 213 results in the finger 215 on the lever 213 being raised clear of the rearward edge of the upper end of the lever 207 (see Fig. 10). It also results in counterclockwise swinging of the lever 189. This occurs because of the engagement of the roller 221 on lever 213 with the inclined ear 223 at the upper end of the lever 189. The end result is that the cam portion 193 of the lever 189 moves in rearward direction (to the right as viewed in Figs. 9 and 15) from behind the cam follower roller 187 on the stop 113. This permits the spring 195 to move the stop 113 from its retracted non-locking position shown in solid lines in Fig. 15 to its locking position shown in dotted lines in Fig. 15. Raising of the lever 213 further results in clockwise pivoting of the lever 267 from its Fig. 9 position (wherein its rearward end is located above and clear of the arm 179) to the Fig. 10 position in which the rearward end of the lever 267 is located behind the arm 179. This action results from plate 269 moving upward with the lever 213, and thereby acting on the roller 268 to pivot the lever 267 clockwise. All the stated movements occur during the initial phase of movement of the selector rod before the lever 59 engages any stop, and before it comes into engagement with the pawl 91.

As the coin receiver moves rearward, the quarter at position Q, engaging the arm 199, rotates the rod 115 counterclockwise as viewed from above, and the nickel at N-1 swings the arm 147 counterclockwise as viewed from above. The stop 107 is thereupon moved to non-locking position concurrently by engagement of stud 135 with the hub 131 of stop 107 and by engagement of shoulder 143 with the finger 145 on the hub 131. Stud 155 engages the hub 151 of the stop 109 to rotate this stop to non-locking position. Stud 185 engages the hub 181 of stop 113 to rotate this stop back to its retracted non-locking position. The lever 207, being free on its pivot 205, is now ineffective to move the arm 175 and stop 111. However, the nickel at N-1 acts to move the stop 111 to non-locking position. Since the nickel acts to swing the arm 147 of lever 141 counterclockwise as viewed from above, arm 149 of the lever 141 acts against arm 235 to rotate the lever 233 clockwise as viewed from above. The upper arm 237 of the lever 233 engages the lower end of the bell crank arm 249, and effects clockwise rotation of the plate 243. Since the rearward end of the lever 267 is now behind the arm 179, this clockwise rotation of the plate 243 is effective to rotate the hub 171 and the stop 111 counterclockwise as viewed from above to move the stop 111 to retracted non-locking position. The stated movement of the stops 107, 109, 111 and 113 to the retracted position occurs before the lever 59 has swung far enough to engage any one of them, and accordingly the selector rod may be completely pulled out for obtaining the thirty cent item. As the coin receiver reaches the rearward end of its stroke, the quarter and the nickel drop into the money drawer.

To obtain a thirty-five cent item, the purchaser may deposit either a silver quarter and two nickels or a silver quarter and a dime. Assuming that a quarter and two nickels are deposited in the coin slot of the machine, the quarter comes to rest at position Q (Fig. 20) and the nickels come to rest at positions N-1 and N-2 (Fig. 24). On pulling out the thirty-five cent selector rod, not only is the coin receiver 325 moved rearward, but also the front price shaft 275 and cam 279 are rocked counterclockwise from the position shown in Fig. 9 to the position in Fig. 11. This results in swinging of the lever 305 from the Fig. 9 to the Fig. 11 position. The finger 321 on lever 305 acts to swing the lever 303 from the Fig. 9 to the Fig. 11 position. Lever 303 raises the lever 213, with the same consequences as previously described in respect to Fig. 10. The swinging of the lever 305 also results in pivoting of the bell crank arm 249 to the position shown in Fig. 11 in which it is clear of the upper arm 237 of the lever 233. This results from camming engagement of the roller 319 at the upper end of lever 305 with the cam 317 formed on the forward end of the lever 257, lever 257 thereby being rocked clockwise from its Fig. 9 position to its Fig. 11 position with the result that the rearward end of the lever 257 moves downward and acts on the roller 253 on the bell crank arm 251 to swing the bell crank 249, 251 counterclockwise. The clockwise rotation of the lever 257 also raises its forward end into a position wherein the lip 318 is engageable with the outer end of the lever 461 on the coin receiver 325 to hold the lever 461 against rocking counterclockwise. All the stated movements occur during the initial phase of movement of the thirty-five cent selector rod before the lever 59 engages any stop and before it comes into engagement with pawl 91. As the coin receiver 325 moves rearward, the quarter at position Q and the nickel at N-1 effect movement of the stops 107, 109 and 113 to non-locking position in the same manner as above described in respect to operation upon pulling out a thirty cent selector. With the lever 461 held against rocking counterclockwise by the lip 318 on lever 257, the toggle lever 425 is locked against rocking and hence the nickel at N-2 is locked for movement with the nickel at N-1. Accordingly, the nickel at N-2 acts to move the arm 167 of lever 161 and hence to move the arm 169 of lever 161 counterclockwise as viewed from above. The arm 169, acting against the finger 245 of plate 243, acts to swing the plate 243 (which is fixed to the rod 227) clockwise as viewed from above. The rearward end of the lever 267 (which is now located behind the arm 179 on the hub 171) thereupon acts to rotate the hub 171 counterclockwise as viewed from above to move the stop 111 to non-locking position. The stated movement of the stops 107, 109, 111 and 113 to their non-locking position occurs before the lever 59 has swung far enough to engage anyone of them, and hence the thirty-five cent selector rod may be completely pulled out for obtaining the thirty-five cent item. As the coin receiver reaches the rearward end of its stroke, the quarter and the two nickels drop into the money drawer.

Assuming that a quarter and a dime are deposited in the coin slot of the machine for obtaining a thirty-five cent item, upon pulling out the thirty-five cent selector rod stops 107, 109 and 113 are moved to non-locking position by the quarter and stop 111 is moved to non-locking position by the dime at position D-1 during the initial phase of movement of the rod, before the lever 59 engages any stop, so that the rod may be pulled out completely.

Assuming a nickel or a dime or any combination of nickels and dimes totalling less than twenty-five cents is deposited in the coin slot of the machine, all the selector rods are effectively locked against operation to obtain any item. That is, while any rod may be pulled out a small distance corresponding to the angle through which lever 59 may turn before its shoulder 105 engages any stop, the rod cannot be completely pulled out for fullstroke operation. If only one nickel is deposited, and a twenty-five cent selector rod is pulled, only the stop 107 will be moved to a non-locking position, and the lever 59 will engage stops 109 and 111 so that the selector rod cannot be fully pulled out. If two nickels are deposited, and a twenty-five cent selector rod pulled again only the stop 107 will be moved to non-locking position. This is because the second nickel (at N-2) lags behind the first nickel as previously described. If three nickels are deposited, and a twenty-five cent selector rod pulled, stops 107 and 109 will be moved to non-locking position, but stop 111 will remain in locking position. If four nickels are deposited, and a twenty-five cent selector rod pulled, again stops 107 and 109 will be moved to non-locking position, but stop 111 will remain in locking position because the fourth nickel (at N-4) lags behind the other three as previously described. If one dime is deposited, and a twenty-five cent selector rod pulled, the stop 111 will be moved to non-locking position, but the stops 107 and 109 will remain in locking position. If either one dime and one nickel or one dime and two nickels are deposited, and a twenty-five cent selector rod pulled, stops 107 and 111 will be moved to non-locking position, but stop 109 will remain in locking position. If two dimes are deposited, and a twenty-five cent selector rod pulled, stops 109 and 111 will be moved to non-locking position, but stop 107 will remain in locking position. The stop 113 moves into locking position when either the thirty cent selector rod or the thirty-five cent selector rod is pulled out. If less than thirty cents is deposited the thirty cent selector rod is effectively locked against full stroke operation. If a silver quarter, and no other coin is deposited, while the permitted initial movement of the thirty cent selector bar moves stops 107, 109 and 113 to non-locking position, stop 111 remains in locking position. If a nickel or a dime or any combination of nickels and dimes totalling less than thirty cents is deposited, stop 113 remains in locking position on pulling the thirty cent rod. For some of these combinations, other stops also remain in locking position (for example, if only one nickel is inserted, stop 109 will remain in locking position as well as stop 113). If less than thirty-five cents is deposited, the thirty-five cent selector rod is effectively locked against full stroke operation. If only a quarter is inserted, while the permitted initial movement of the thirty-five cent rod moves stops 107, 109 and 113 to non-locking position, stop 111 remains in locking position. If a quarter and one nickel are inserted, while the permitted initial movement of the thirty-five cent rod moves stops 107, 109 and 113 to non-locking position, again stop 111 remains in locking position. If a nickel or a dime or any combination of nickels and dimes totalling less than thirty-five cents is deposited, stop 113 remains in locking position on pulling out the thirty-five cent rod.

To convert the machine from the twenty-five cent, thirty cent, thirty-five cent set-up to a twenty cent, twenty-five cent, thirty cent set-up, the clip 321 is taken off and replaced in reversed position with the screw 323 entered in hole 324, so that the finger 321a extends in the rear of lever 303 instead of in the front of the lever 303, and is spaced rearward of the lever 303 (see Figs. 9B and 9C). The bar 575 and member 577 are added. The conversion also requires that those selector rods R for dispensing twenty cent items be made to rock the front price shaft 275. This is accomplished by appropriate setting of the arms 289 on the shaft 275 for rocking the shaft 275 on pulling out any twenty cent selector rod R. Those selector rods R for dispensing twenty-five cent items do not rock either of the shafts 273 or 275, and those selector rods R for dispensing thirty cent items are made to rock the rear price shaft 273 by appropriate setting of the arms 287 on shaft 273.

To obtain a twenty cent item, the purchaser may deposit either two dimes, one dime and two nickels or four nickels. Assuming that four nickels are deposited in the coin slot of the machine to obtain a twenty cent item, the nickels come to rest at positions N–1 to N–4. On pulling out a twenty cent selector rod, not only is that coin receiver 325 moved rearward, but also the front price shaft 275 and the cam 279 are locked counterclockwise from the position shown in Fig. 9 to the position shown in Fig. 11. This results in swinging of the lever 305 from the position shown in Fig. 9 to the Fig. 11, but lever 303 remains in its original position. Lever 305 rotates the lever 257 and raises its forward end into position wherein the lip 318 is engageable with the outer end of the lever 461 on the coin receiver 325 to hold the lever 461 against rocking counterclockwise. Also, when the lever 305 swings from the Fig. 9 to the Fig. 11 position, the finger 321a on the re-positioned clip 321 engages the forward end of the bar 575 and moves this bar rearward. The extension 579, engaging the finger 145, thereupon swings open the stop 107. The second and third nickels at positions N–2 and N–3, which are both locked to move with the nickel at N–1 since lever 461 is locked, act to open the stop 109. The fourth nickel at N–4, which is also locked to move simultaneously with the other nickels since lever 461 is locked, opens the stop 111. The stop 113 is already in retracted position. Accordingly, the twenty cent selector rod may be completely pulled out. Assuming that one dime and two nickels are deposited to obtain a twenty cent item, stop 107 is opened in the same manner, the second nickel opens the stop 109, the dime at D–1 opens the stop 111, and stop 113 is already open. Assuming that two dimes are deposited, stop 107 is opened in the same manner, the first dime at D–1 opens the stop 111, the second dime at D–2 opens the stop 109, and stop 113 is already open.

To obtain a twenty-five cent item, the purchaser may deposit either a quarter, two dimes and one nickel, one dime and three nickels, or five nickels. Under these circumstances, the operation is the same as previously described for pulling out a twenty-five cent rod with the twenty-five cent, thirty cent and thirty-five cent set-up.

To obtain a thirty cent item, the purchaser must deposit a quarter and one nickel. Upon pulling out a thirty cent rod, not only is the coin receiver 325 moved rearward, but also the rear price shaft 273 and the cam 277 are rocked to rock the lever 303 from the position shown in Fig. 9 to the position shown in Figs. 10 and 11. This results in movement of the stop 113 to locking position. The quarter acts as previously described to open stops 107, 109 and 113, and the nickel acts to open the stop 111, in the same manner as described above for the twenty-five cent, thirty cent, thirty-five cent set-up.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a vending machine having a first and a second selector operable to obtain items of a first and a second price, respectively, means for locking both selectors against operation to obtain any item comprising a first stop means movable between locking and non-locking positions and normally occupying its locking position, means for locking the second selector against operation to obtain any item of the second price comprising a second stop means movable between locking and non-locking positions and normally occupying its non-locking position, means operable upon operation of the second selector but not upon operation of the first for moving said second stop means to its locking position, a movable coin receiver, means operable by either selector for moving the receiver, and coin-driven means responsive to the presence in the receiver of coin in the amount of the first price and operation of the first selector to move the first stop means to non-locking position, and responsive to the presence in the receiver of coin in the amount of the second price and operation of the second selector for moving both stop means to non-locking position.

2. In a vending machine having a first and a second selector operable to obtain items of a first and a second price, respectively, each selector requiring full-stroke operation for obtaining an item of the respective price, means for locking both selectors against operation to obtain any item comprising a first stop means movable between a locking position in which only limited operation of the selectors is allowed and a non-locking position in which full-stroke operation is allowed, said first stop means normally occupying its locking position, means for locking the second selector against operation to obtain any item of the second price comprising a second stop means movable between a locking position in which only limited operation of the second selector is allowed and a non-locking position in which full-stroke operation is allowed, said second stop means normally occupying its non-locking position, means operable upon said limited operation of the second selector but not upon operation of the first for moving said second stop means to its locking position, a movable coin receiver, means operable by either selector for moving the receiver, and coin-driven means responsive to the presence in the receiver of coin in the amount of the first price and said limited operation of the first selector to move the first stop means to non-locking position, and responsive to the presence in the receiver of coin in the amount of the second price and said limited operation of the second selector for moving both stop means to non-locking position.

3. In a vending machine having a first, a second and a third selector operable to obtain items of a first, a second and a third price, respectively, means for locking all the selectors against operation to obtain any item comprising a first stop means movable between locking and non-locking positions and normally occupying its locking position, means for locking the second and third selectors against operation to obtain items of the second and third prices comprising a second stop means movable between locking and non-locking positions and normally occupying its non-locking position, means operable upon operation of the second and third selectors but not upon operation of the first selector for moving said second stop means to its locking position, a movable coin receiver, means operable by any selector for moving the receiver, and coin-driven means responsive to the presence in the receiver of coin in the amount of the first price and operation of the first selector to move said first stop means to non-locking position, and responsive to the presence in the receiver of coin in the amount of the second price or the third price and operation of the second or third selector to move both the first and second stop means to non-locking position.

4. In a vending machine having a first, a second and a third selector operable to obtain items of a first, a second and a third price, respectively, each selector requiring full stroke operation for obtaining an item of the respective price, means for locking all the selectors against operation to obtain any item comprising a first stop means movable between a locking position in which only limited operation of the selectors is allowed and a non-locking position in which full-stroke operation is allowed, said first stop means normally occupying its locking position, means for locking the second and third selectors against operation to obtain items of the second and third prices comprising a second stop means movable between a locking position in which only limited operation of the second and third selectors is allowed and a non-locking position in which full-stroke operation is allowed, said second stop means normally occupying its non-locking position, means operable upon said limited operation of the second and third selectors but not upon operation of the first selector for moving said second stop means to its locking position, a movable coin receiver, means operable by any selector for moving the receiver, and coin-driven means responsive to the presence in the receiver of coin in the amount of the first price and said limited operation of the first selector to move said first stop means to non-locking position, and responsive to the presence in the receiver of coin in the amount of the second price or the third price and said limited operation of the second or third selector to move both the first and second stop means to non-locking position.

5. In a vending machine having at least three manually operable mechanical dispensers adapted to dispense twenty-five cent, thirty cent and thirty-five cent items, respectively, each dispenser including a pull-out rod adapted to be pulled out from a retracted position and then returned to retracted position for dispensing an item, means for holding all the rods against operation to dispense any item including a set of stops and means for holding the thirty cent and thirty-five cent rods against operation to dispense any thirty cent or thirty-five cent items including a single stop, each stop being movable between a locking and a non-locking position, each stop, in its locking position, allowing limited rod movement insufficient for dispensing an item, each of said stops in said set normally occupying its locking position and said single stop normally occupying its non-locking position, means responsive to pulling out the thirty cent or the thirty-five cent rod for moving said single stop to locking position, a movable coin receiver having a nickel chute, a dime chute and a quarter chute, means operable by any rod for moving the coin receiver, and coin-driven means responsive to the presence in the receiver of a quarter, or two dimes and a nickel, or one dime and three nickels, or five nickels and pulling out the twenty-five cent rod for moving each stop of said set to non-locking position, said coin-driven means being responsive to the presence in the receiver of a quarter and a nickel and pulling out the thirty cent rod for moving all stops to non-locking position, and said coin-driven means being responsive to the presence in the receiver of a quarter and a dime or a quarter and two nickels and pulling out the thirty-five cent rod for moving all stops to non-locking position.

6. In a vending machine having at least three manually operable mechanical dispensers adapted to dispense twenty-five cent, thirty cent and thirty-five cent items, respectively, each dispenser including a pull-out rod adapted to be pulled out from a retracted position and then returned to retracted position for dispensing an item, means for holding all the rods against operation to dispense any item including first, second and third stops and means for holding the thirty cent and thirty-five cent rods against operation to dispense any thirty cent or thirty-five cent items including a fourth stop, each stop being movable between a locking and a non-locking position, each stop, in its locking position, allowing limited rod movement insufficient for dispensing an item, each of said first, second and third stops normally occupying its locking position, said fourth stop normally occupying its non-locking position, means responsive to pulling out the thirty cent or the thirty-five cent rod for moving the fourth stop to locking position, a movable coin receiver having a nickel chute, a dime chute and a quarter chute, means operable by any rod for moving the coin receiver, a coin-driven means operable by a first nickel in the nickel chute on pulling out the twenty-five cent rod for moving the first stop to non-locking position, a coin-driven means operable by a second nickel in the nickel chute on pulling out the thirty-five cent rod for moving the second stop to non-locking position, and also being operable by a second dime in the dime chute on pulling out the twenty-five cent rod, a coin-driven means operable by a third nickel in the nickel chute on pulling out the twenty-five cent rod for moving the second stop to non-locking position, a coin-driven means operable by a fifth nickel in the nickel chute on pulling out the twenty-five cent rod for moving the third stop to non-locking position, and also being operable by a first dime in the dime chute on pulling out the twenty-five cent or the thirty-five cent rod, and a coin-driven means operable by a quarter in the quarter chute on pulling out the twenty-five cent rod for moving the first, second and third stops to non-locking position, and operable on pulling out the thirty cent or the thirty-five cent rod for moving the first, second and fourth stops to non-locking position, and means operable on pulling out the thirty cent rod for driving the third stop from the first mentioned coin-driven means, and operable on pulling out the thirty-five cent rod for driving the third stop from the second mentioned coin-driven means.

7. In a vending machine having at least three manually operable mechanical dispensers adapted to dispense twenty-five cent, thirty cent and thirty-five cent items, respectively, each dispenser including a pull-out rod adapted to be pulled out from a retracted position and then returned to retracted position for dispensing an item, means for holding all the rods against operation to dispense any item including first, second and third stops and means for holding the thirty cent and thirty-five cent rods against operation to dispense any thirty cent or thirty-five cent items including a fourth stop, each stop being movable between a locking and a non-locking position, each stop, in its locking position, allowing a limited movement of any rod insufficient for dispensing an item, each of said first, second and third stops normally occupying its locking position, said fourth stop normally occupying its non-locking position, means responsive to pulling out the thirty cent or the thirty-five cent rod for moving the fourth stop to locking position, a movable coin receiver having a nickel chute, a dime chute and a quarter chute, means operable by any rod for moving the coin receiver, means for holding from one to five nickels in the nickel chute, one or two dimes in the dime chute, and a quarter in the quarter chute, for movement with the coin receiver, said holding means being releasable as to the second nickel if there are only two nickels in the nickel chute and as to the fourth nickel if there are only four nickels in the nickel chute, means carried by the receiver for locking the second nickel against release when there are only two nickels in the nickel chute and for locking the fourth nickel against release when there are only four nickels in the nickel chute, means engageable by the first nickel moving with the receiver for moving the first stop to non-locking position, means engageable by the second nickel when locked against release and moving with the receiver or by the second dime moving with the receiver for moving the second stop to non-locking position, means engageable by the third nickel moving with the coin receiver for moving the second stop to non-locking position, means engageable by the fourth nickel when locked against release and moving with the coin receiver for moving the third stop to non-locking position, means engageable by the fifth nickel or the first dime moving with the coin receiver for moving the third stop to non-locking position, means engageable by a quarter moving with the coin receiver upon pulling out the twenty-five cent rod for moving the first, second and third stops to non-locking position, and upon pulling out either the thirty cent or thirty-five cent rod for moving the first, second and fourth stop to non-locking position, means operable on pulling out of the thirty cent rod for establishing a drive from the said means engageable by the first nickel to the third stop, means operable on pulling out the thirty-five cent rod for operating said means for locking the second and fourth nickels against release, and for establishing a drive from the said means engageable by the second nickel to the third stop.

8. In a vending machine having at least three manually operable mechanical dispensers adapted to dispense twenty cent, twenty-five cent and thirty cent items, respectively, each dispenser including a pull-out rod adapted to be pulled out from a retracted position and then returned to retracted position for dispensing an item, means for holding all the rods against operation to dispense any item including a set of stops and means for holding the thirty cent rod against operation to dispense any thirty cent item including a single stop, each stop being movable between a locking and a non-locking position, each stop, in its locking position, allowing limited rod movement insufficient for dispensing an item, each of said stops in said set normally occupying its locking position and said single stop normally occupying its non-locking position, means responsive to pulling out the thirty cent rod for moving said single stop to locking position, a movable coin receiver having a nickel chute, a dime chute and a quarter chute, means operable by any rod for moving the coin receiver, and coin-driven means responsive to the presence in the receiver of two dimes, one dime and two nickels, or four nickels, and pulling out the twenty cent rod for moving each stop of said set to non-locking position, said coin-driven means being responsive to the presence in the receiver of a quarter, or two dimes and one nickel, or one dime and three nickels, or five nickels, and pulling out the twenty-five cent rod for moving each stop of said set to non-locking position, and said coin-driven means being responsive to the presence in the receiver of a quarter and a nickel and pulling out the thirty cent rod for moving all stops to non-locking position.

9. In a vending machine having at least three manually operable mechanical dispensers adapted to dispense twenty cent, twenty-five cent and thirty cent items, respectively, each dispenser including a pull-out rod adapted to be pulled out from a retracted position and then returned to retracted position for dispensing an item, means for holding all the rods against operation to dispense any item including first, second and third stops and means for holding the thirty cent rod against operation to dispense any thirty cent item including a fourth stop, each stop being movable between a locking and a non-locking position, each stop, in its locking position, allowing limited rod movement insufficient for dispensing an item, each of said first, second and third stops normally occupying its locking position, said fourth stop normally occupying its non-locking position, means responsive to pulling out the thirty cent rod for moving the fourth stop to locking position, a movable coin receiver having a nickel chute, a dime chute and a quarter chute, means operable by any rod for moving the coin receiver, means operable on pulling out the twenty cent rod for moving the first stop to non-locking position, a first coin-driven means operable by a first nickel in the nickel chute on pulling out the twenty-five cent rod for moving the first stop to non-locking position, a second coin-driven means operable by a second nickel in the nickel chute on pulling out the twenty cent rod for moving the second stop to non-locking position, and also being operable by a second dime in the dime chute on pulling out the twenty cent or twenty-five cent rod, a third coin-driven means operable by a third nickel in the nickel chute on pulling out the twenty cent or twenty-five cent rod for moving the second stop to non-locking position, a fourth coin-driven means operable by a fourth nickel on pulling out the twenty cent rod for moving the third stop to non-locking position, a fifth coin-driven means operable by a fifth nickel in the nickel chute on pulling out the twenty-five cent rod for moving the third stop to non-locking position, and also being operable by a first dime in the dime chute on pulling out the twenty cent or the twenty-five cent rod, and a sixth coin-driven means operable by a quarter in the quarter chute on pulling out the twenty-five cent rod for moving the first, second and third stops to non-locking position, and operable on pulling out the thirty cent rod for moving the first, second and fourth stops to non-locking position, and means operable on pulling out the thirty cent rod for driving the third stop from the first coin-driven means.

10. In a vending machine having at least three manually operable mechanical dispensers adapted to dispense twenty cent, twenty-five cent and thirty cent items, respectively, each dispenser including a pull-out rod adapted to be pulled out from a retracted position and then returned to retracted position for dispensing an item, means for holding all the rods against operation to dispense any item including first, second and third stops and means for holding the thirty cent rod against operation to dispense any thirty cent item including a fourth stop, each stop being movable between a locking and a non-locking position, each stop, in its locking position, allowing limited rod movement insufficient for dispensing an item, each of said first, second and third stops normally occupying its locking position, said fourth stop normally occupying its non-locking position, means responsive to pulling out the thirty cent rod for moving the fourth stop to locking position, a movable coin receiver having a nickel chute, a dime chute and a quarter chute, means operable by any rod for moving the coin receiver, means for holding from one to five nickels in the nickel chute, one or two dimes in the dime chute, and a quarter in the quarter chute, for movement with the coin receiver, said holding means being releasable as to the second nickel if there are only two nickels in the nickel chute and as to the fourth nickel if there are only four nickels in the nickel chute, means carried by the receiver for locking the second nickel against release when there are only two nickels in the nickel chute and for locking the fourth nickel against release when there are only four nickels in the nickel chute, means operable on pulling out the twenty cent rod for moving the first stop to non-locking position, means engageable by the first nickel moving with the receiver for moving the first stop to non-locking position, means engageable by the second nickel when locked against release and moving with the receiver or by the second dime moving with the receiver for moving the second stop to non-locking position, means engageable by the third nickel moving with the coin receiver for moving the second stop to non-locking position, means engageable by the fourth nickel when locked against release and moving with the coin receiver for moving the third stop to non-locking position, means engageable by the fifth nickel or the first dime moving with the coin receiver for moving the third stop to non-locking position, means engageable by a quarter moving with the coin receiver upon pulling out the twenty-five cent rod for moving the first, second and third stops to non-locking position, and upon pulling out the thirty cent rod for moving the first, second and fourth stops to non-locking position, means operable on pulling out the thirty cent rod for establishing a drive from the said means engageable by the first nickel to the third stop, and means operable on pulling out the twenty cent rod for operating said means for locking the second and fourth nickels against release.

11. In a vending machine having a first and a second selector operable to obtain items of a first and a second price, respectively, a control member movable upon operation of either selector, first and second stop means each of which is movable between a locking position wherein it is engageable by the control member and a non-locking position wherein it is clear of the control member, the first stop means normally occupying its locking position, and the second stop means normally occupying its non-locking position, means operable upon operation of the second selector but not upon operation of the first for moving said second stop means to its locking position, and selector-operated coin-controlled mechanism operable upon deposit in the machine of coin in the amount of the first price and operation of the first selector to move the first stop means to non-locking position, and operable upon deposit of coin in the amount of the second price and operation of the second selector for moving both stop means to non-locking position.

12. In a vending machine having a first and a second selector operable to obtain items of a first and a second price, respectively, each selector requiring full-stroke operation for obtaining any item of the respective price, a movable control member, means for moving said control member upon operation of either selector, first and second stop means each of which is movable between a locking position in which it is engageable by the control member to allow only limited operation of a selector and a non-locking position in which it is clear of the control member to allow full-stroke operation, the first stop means normally occupying its locking position and the second stop means normally occupying its non-locking position, means operable upon said limited operation of the second selector but not upon operation of the first for moving said second stop means to its locking position, and selector-operated coin-controlled mechanism operable upon deposit in the machine of coin in the amount of the first price and said limited operation of the first selector to move the first stop means to non-locking position, and operable upon deposit of coin in the amount of the second price and said limited operation of the second selector for moving both stop means to non-locking position.

13. In a vending machine having a first, a second and a third selector operable to obtain items of a first, a second and a third price, respectively, a control member movable upon operation of any selector, first and second stop means each of which is movable between a locking position wherein it is engageable by the control member and a non-locking position wherein it is clear of the control member, the first stop means normally occupying its locking position and the second stop means normally occupying its non-locking position, means operable upon operation of the second and third selectors but not upon operation of the first selector for moving said second stop means to its locking position, and selector-operated coin-controlled mechanism operable upon deposit in the machine of coin in the amount of the first price and operation of the first selector to move said first stop means to non-locking position, said mechanism also being operable upon deposit in the machine of coin in the amount of the second price or the third price and operation of the second or third selector to move both the first and second stop means to non-locking position.

14. In a vending machine having a first, a second and a third selector operable to obtain items of a first, a second and a third price, respectively, each selector requiring full-stroke operation for obtaining an item of the respective price, a movable control member, means for moving said control member upon operation of any of the selectors, first and second stop means each of which is movable between a locking position in which it is engageable by the control member to allow only limited operation of a selector and a non-locking position in which it is clear of the control member to allow full-stroke operation, the first stop means normally occupying its locking position and the second stop means normally occupying its non-locking position, means operable upon said limited operation of the second and third selectors but not upon operation of the first selector for moving said second stop means to its locking position, and selector-operated coin-controlled mechanism operable upon deposit in the machine of coin in the amount of the first price and said limited operation of the first selector to move said first stop means to non-locking position, said mechanism also being operable upon deposit in the machine of coin in the amount of the second price or the third price and said limited operation of the second or third selector to move both the first and second stop means to non-locking position.

References Cited in the file of this patent

UNITED STATES PATENTS

| | | |
|---|---|---|
| 1,926,848 | Giles | Sept. 12, 1933 |
| 2,246,155 | Watling | June 17, 1941 |
| 2,529,196 | Stoner | Nov. 7, 1950 |